(12) United States Patent
Woodfill et al.

(10) Patent No.: US 9,183,461 B2
(45) Date of Patent: Nov. 10, 2015

(54) SYSTEMS AND METHODS FOR ROW CAUSAL SCAN-ORDER OPTIMIZATION STEREO MATCHING

(71) Applicant: Intel Corporation, Santa Clara, CA (US)

(72) Inventors: John I. Woodfill, Palo Alto, CA (US); Etienne G. Grossmann, Redwood City, CA (US); Gaile Gordon, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 219 days.

(21) Appl. No.: 13/976,794

(22) PCT Filed: May 9, 2013

(86) PCT No.: PCT/US2013/040362
§ 371 (c)(1),
(2) Date: Jun. 27, 2013

(87) PCT Pub. No.: WO2013/170040
PCT Pub. Date: Nov. 14, 2013

(65) Prior Publication Data
US 2014/0205181 A1    Jul. 24, 2014

Related U.S. Application Data

(60) Provisional application No. 61/645,989, filed on May 11, 2012.

(51) Int. Cl.
*G06K 9/62* (2006.01)
*G06T 7/00* (2006.01)
(Continued)

(52) U.S. Cl.
CPC .......... *G06K 9/6202* (2013.01); *G06K 9/00201* (2013.01); *G06T 1/20* (2013.01); *G06T 7/0075* (2013.01); *H04N 13/0203* (2013.01); *H04N 2013/0081* (2013.01)

(58) Field of Classification Search
USPC .................................. 382/154, 294
See application file for complete search history.

(56) References Cited

U.S. PATENT DOCUMENTS 3,946,696 A    3/1976    Lubnow
3,990,045 A    11/1976    Beausoleil et al.
(Continued)

FOREIGN PATENT DOCUMENTS

DE    4 304 529 C1    6/1994
EP    0 512 403 A2    11/1992
(Continued)

OTHER PUBLICATIONS

Soherer, P.A., "Spherically Symmetrical Lenses and Associated Equipment for Wide Angle Aerial Photography," Optical Research Laboratory Harvard University, Office of Scientific Research and Development, National Defense Research Committee, Section 16.1, Report No. 118, Nov. 30, 1945, 119 pages.
(Continued)

*Primary Examiner* — Ishrat I Sherali
(74) *Attorney, Agent, or Firm* — Green, Howard & Mughal, LLP

(57) ABSTRACT

Systems and methods to determine a disparity map using row causal scanline optimization stereo matching are presented. A method includes, for each corresponding pixel P between a pair of input stereo images, and for each considered disparity, determining a basic match cost and a match cost for each of a set of given orientations including an east orientation and one or more other orientations, determining an overall match cost for each pixel at each considered disparity based on a sum of the determined match costs for all considered orientations for each pixel and disparity pair, and determining a resulting disparity for each pixel based on a minimum of the determined overall match costs, where a subset of the determined resulting disparities becomes available prior to completion of the input images being read in, and where the resulting disparities for all pixels are determined in a single pass through the input images.

25 Claims, 26 Drawing Sheets

(51) Int. Cl.
*G06K 9/00* (2006.01)
*H04N 13/02* (2006.01)
*G06T 1/20* (2006.01)
*H04N 13/00* (2006.01)

(56) References Cited

U.S. PATENT DOCUMENTS

| | | |
|---|---|---|
| 4,067,027 A | 1/1978 | Yamazaki |
| 4,418,993 A | 12/1983 | Lipton |
| 4,464,788 A | 8/1984 | Sternberg et al. |
| 4,541,114 A | 9/1985 | Rutenbar et al. |
| 4,703,513 A | 10/1987 | Gennery |
| 4,717,958 A | 1/1988 | Gal et al. |
| 4,751,570 A | 6/1988 | Robinson |
| 4,761,066 A | 8/1988 | Carter |
| 4,845,767 A | 7/1989 | Mori et al. |
| 4,850,027 A | 7/1989 | Kimmel |
| 4,879,596 A | 11/1989 | Miura et al. |
| 4,905,081 A | 2/1990 | Morton |
| 5,004,328 A | 4/1991 | Suzuki et al. |
| 5,049,988 A | 9/1991 | Sefton et al. |
| 5,063,441 A | 11/1991 | Lipton et al. |
| 5,142,357 A | 8/1992 | Lipton et al. |
| 5,179,441 A | 1/1993 | Anderson et al. |
| 5,206,503 A | 4/1993 | Toops |
| 5,270,861 A | 12/1993 | Estelle |
| 5,274,717 A | 12/1993 | Miura et al. |
| 5,402,171 A | 3/1995 | Tagami et al. |
| 5,436,984 A | 7/1995 | Sarkkinen et al. |
| 5,440,343 A | 8/1995 | Parulski et al. |
| 5,453,784 A | 9/1995 | Krishnan et al. |
| 5,453,785 A | 9/1995 | Lenhardt et al. |
| 5,454,064 A | 9/1995 | Castelaz |
| 5,548,327 A | 8/1996 | Gunday et al. |
| 5,633,491 A | 5/1997 | Kasdan |
| 5,650,862 A | 7/1997 | Shimizu et al. |
| 5,652,616 A | 7/1997 | Chen et al. |
| 5,712,483 A | 1/1998 | Boone et al. |
| 5,719,954 A | 2/1998 | Onda |
| 5,721,608 A | 2/1998 | Taniguchi |
| 5,721,611 A | 2/1998 | Kellner |
| 5,727,078 A | 3/1998 | Chupeau |
| 5,727,087 A | 3/1998 | Matoba et al. |
| 5,764,871 A | 6/1998 | Fogel |
| 5,767,922 A | 6/1998 | Zabih et al. |
| 5,768,404 A | 6/1998 | Morimura et al. |
| 5,812,191 A | 9/1998 | Orava et al. |
| 5,819,120 A | 10/1998 | Hamada et al. |
| 5,861,994 A | 1/1999 | Kelly |
| 5,864,630 A | 1/1999 | Cosatto et al. |
| 5,917,937 A | 6/1999 | Szeliski et al. |
| 5,969,760 A | 10/1999 | Ernest et al. |
| 6,028,672 A | 2/2000 | Geng |
| 6,038,071 A | 3/2000 | Chikazawa |
| 6,115,482 A | 9/2000 | Sears et al. |
| 6,141,036 A | 10/2000 | Katayama et al. |
| 6,141,434 A | 10/2000 | Christian et al. |
| 6,141,440 A | 10/2000 | Melen |
| 6,188,777 B1 | 2/2001 | Darrell et al. |
| 6,204,880 B1 | 3/2001 | Nishimura |
| 6,215,898 B1 * | 4/2001 | Woodfill et al. .............. 382/154 |
| 6,456,737 B1 | 9/2002 | Woodfill et al. |
| 6,587,148 B1 | 7/2003 | Takeda et al. |
| 6,661,918 B1 | 12/2003 | Gordon et al. |
| 6,693,666 B1 | 2/2004 | Baker et al. |
| 6,807,290 B2 | 10/2004 | Liu et al. |
| 6,967,678 B2 | 11/2005 | Baker et al. |
| 7,317,830 B1 | 1/2008 | Gordon et al. |
| 7,330,593 B2 | 2/2008 | Hong et al. |
| 7,486,311 B2 | 2/2009 | Baker et al. |
| 7,567,702 B2 | 7/2009 | Woodfill et al. |
| 7,570,805 B2 | 8/2009 | Gu |
| 7,847,826 B2 | 12/2010 | Baker et al. |
| 7,925,077 B2 | 4/2011 | Woodfill et al. |
| 8,260,040 B2 | 9/2012 | Woodfill et al. |
| 8,428,342 B2 * | 4/2013 | Tian et al. .............. 382/154 |
| 8,582,866 B2 * | 11/2013 | El Dokor et al. .............. 382/154 |
| 8,639,024 B2 | 1/2014 | Woodfill et al. |
| 8,755,592 B2 * | 6/2014 | Lim et al. .............. 382/154 |
| 8,867,826 B2 * | 10/2014 | Rzeszutek et al. .............. 382/154 |
| 9,020,242 B2 * | 4/2015 | Bingrong et al. .............. 382/154 |
| 2004/0022431 A1 | 2/2004 | Beardsley |
| 2004/0135886 A1 | 7/2004 | Baker et al. |
| 2006/0013473 A1 | 1/2006 | Woodfill et al. |
| 2008/0246759 A1 | 10/2008 | Summers |
| 2011/0050853 A1 | 3/2011 | Zhang et al. |

FOREIGN PATENT DOCUMENTS

| | | |
|---|---|---|
| GB | 2 210 530 A | 6/1989 |
| JP | 2-238576 A | 9/1990 |
| JP | 05-288532 | 11/1993 |
| JP | 7-303207 A | 11/1995 |
| WO | 98/47061 A2 | 10/1998 |
| WO | 98/47061 A3 | 2/1999 |
| WO | 98/47061 A9 | 5/1999 |
| WO | 2013/170040 A1 | 11/2013 |

OTHER PUBLICATIONS

Hannah, Marsha Jo, "Computer Matching of Areas in Stereo Images," PhD Dissertation, Stanford University, May 1974, pp. 1-123, 133 pages.

Zabih, et al., "Non-Parametric Local Transforms for Computing Visual Correspondence," 3rd European Conference on Computer Vision, Stockholm, Sweden, May 2-6 1994, pp. 151-158, 8 pages.

Baker, et al., "Realtime Stereo and Motion Integration for Navigation", Proc. SPIE 2357, ISPRS Commission III Symposium: Spatial Information from Digital Photogrammetry and Computer Vision, vol. 2357, Aug. 17, 1994, pp. 17-24, 8 pages.

Woodfill, et al., "Real-time Stereo Vision on the Parts Reconfigurable Computer", Proceedings of the 5th Annual IEEE Field-Programmable Custom Computing Machines, Apr. 16-18, 1997, Napa Valley, California, pp. 201-210, 10 pages.

Kayaalp, et al., "A Pipeline Architecture for Near Real-time Stereo Range Detection", Proc. SPIE 1007, Mobile Robots III, vol. 1007, 1988, pp. 279-286, 8 pages.

McDonnell, M. J., "Box-Filtering Techniques," Computer Graphics and Image Processing, vol. 17, No. 1, Sep. 1981, pp. 65-70, 6 pages.

Yoshida, et al., "Real-Time Stereo Vision with Multiple Arrayed Camera," Proceedings of 1992 IEEE International Conference on Robotics and Automation, Nice, France, May 1992, vol. 2, pp. 1765-1770, 6 pages.

Taniguchi, et al., "Scene Interpretation by Fusing Intermediate Results of Multiple Visual Sensory Information Processing," IEEE International Conference on Multisensor Fusion and Integration for Intelligent Systems, Las Vegas, Nevada, Oct. 2-5, 1994, pp. 699-706, 8 pages.

Appenzeller, et al., "A Low-Cost Real-Time Stereo Vision System for Looking at People," Proceedings of the IEEE International Symposium on Industrial Electronics, 1997, ISIE '97, vol. 3, Guimaraes, Portugal, Jul. 7-11, 1997, pp. 767-772, 6 pages.

Kim, et al., "Facial Region Detection Using Range Color Information," IEICE Transactions on Information and Systems, vol. E81-D, No. 9, Sep. 25, 1998, pp. 968-975, 8 pages.

Lewis, et al., "WFOV Star Tracker Camera," Proc. SPIE 1478, Sensors and Sensor Systems for Guidance and Navigation, vol. 1478, Jul. 1, 1991, conference at Orlando, Florida, Apr. 1, 1991, 11 pages.

Malassiotis, et al., "Coding of video-conference stereo image sequences using 3D models," Signal Processing: Image Communication, vol. 9, No. 2, Jan. 1997, pp. 125-135, 11 pages.

Nickerson, et al., "The ARK project: Autonomous mobile robots for known industrial environments," Robotics and Autonomous Systems, vol. 25, Issues 1-2, Oct. 1998, pp. 83-104, 22 pages.

International Preliminary Report on Patentability and Written Opinion received for PCT Patent Application No. PCT/US2013/040362, mailed on Nov. 20, 2014, 8 pages.

Hirschmuller, Heiko, "Stereo Processing by Semi-Global Matching and Mutual Information", Accepted on Apr. 16, 2007 for publication,

(56) References Cited

OTHER PUBLICATIONS

IEEE Transactions on Pattern Analysis and Machine Intelligence, vol. 30, Issue 2, pp. 328-341, published Feb. 14, 2008, 14 pages.
Gehrig, Stefan K., et al., "A Real-Time Low-Power Stereo Vision Engine Using Semi-Global Matching", Daimler AG Group Research, 71059 Sindelfingen, Germany, Supercomputing Systems AG Technoparkstr 11, Zuerich, 8005 Zuerich, Switzerland, M. Fritz, B. Schiele, and J.H. P, 2009, 10 pages.
Humenberger, Martin et al., "A Census-Based Stereo Vision Algorithm Using Modified Semi-Global Matching and Plane Fitting to Improve Matching Quality", AIT Austrian Institute of Technology, Donau-City-Strasse 1, 1220 Vienna, Austria, published in Computer Vision a, 2010, 8 pages.
International Search Report and Written Opinion received for PCT Patent Application No. PCT/US2013/040362, mailed on Aug. 27, 2013, 11 pages.
Abstract, Baker, et al., "Real-time Stereo and Motion Integration for Navigation", Proc. SPIE 2357, ISPRS Commission III Symposium: Spatial Information from Digital Photogrammetry and Computer Vision, vol. 2357, Aug. 17, 1994, pp. 17-24, 1 page.
Abstract, Woodfill, et al., "Real-time stereo vision on the Parts reconfigurable computer", Proceedings of the 5th Annual IEEE Field-Programmable Custom Computing Machines, Apr. 16-18, 1997, Napa Valley, California, pp. 201-210, 1 page.
Kanade, et al., "A Stereo Machine for Video-Rate Dense Depth Mapping and Its New Applications", Proceedings of 15th Computer Vision and Pattern Recognition Conference (CVPR), Jun. 18-20, 1996, San Francisco, California, pp. 196-202, 7 pages.
Kanade, et al., "Development of a Video-Rate Stereo Machine", Proceedings of International Robotics and Systems Conference (IROS'95), Pittsburgh, Pennsylvania, Aug. 5-9, 1995, pp. 95-100.
Abstract, Kayaalp, et al., "A Pipeline Architecture for Near Real-Time Stereo Range Detection", Proc. SPIE 1007, Mobile Robots III, vol. 1007, 1988, pp. 179-286, 1 page.
Abstract, McDonnell, M. J., "Box-Filtering Techniques," Computer Graphics and Image Processing, vol. 17, No. 1, Sep. 1981, pp. 65-70, 1 page.
Woodfill, John Iselin, "Motion Vision and Tracking for Robots in Dynamic, Unstructured Environments," PhD Dissertation, Stanford University, Oct. 1992, pp. 1-151, 163 pages.
Abstract, Yoshida, et al., "Real-Time Stereo Vision with Multiple Arrayed Camera," Proceedings of 1992 IEEE International Conference on Robotics and Automation, Nice, France, May 1992, vol. 2, pp. 1765-1770, 1 page.
Abstract, Taniguchi, et al., "Scene interpretation by fusing intermediate results of multiple visual sensory information processing," IEEE International Conference on Multisensor Fusion and Integration for Intelligent Systems, Las Vegas, Nevada, 1994, pp. 699-706, 1 page.
Zabih, et al., "Non-Parametric Local Transforms for Computing Visual Correspondence", In Proceedings of European Conference on Computer Vision, Stockholm, Sweden, May 1994, pp. 151-158, 8 pages.
International Search Report received for PCT Patent Application No. PCT/US1998/006675, mailed on Nov. 10, 1998, 2 pages.
Abstract, Park, et al., "Realtime Tracking System for the Wide-Field-Of-View Telescope Project," Proc. SPIE 1111, Acquisition, Tracking, and Pointing III, 196, vol. 1111, Sep. 26, 1989, conference at Orlando, Florida, Mar. 27, 1989, 2 pages.
Abstract, Appenzeller, et al., "A low-cost real-time stereo vision system for looking at people," Proceedings of the IEEE International Symposium on Industrial Electronics, 1997, ISIE '97, vol. 3, Guimaraes, Portugal, Jul. 7-11, 1997, pp. 767-772, 2 pages.
Darrell, et al., "Integrated person tracking using stereo, color, and pattern detection" (partial available copy), International Journal of Computer Vision, vol. 32, No. 2, copyright 2000, Kluwer Academic Publishers, The Netherlands, pp. 175-185, 2 pages available.
Gordon, et al., "Background estimation and removal based on range and color," In Proceedings of the IEEE Computer Society Conference on Computer Vision and Pattern Recognition, Fort Collins, Colorado, Jun. 1999, 6 pages.
Abstract, Kim, et al., "Facial Region Detection Using Range Color Information," IEICE Transactions on Information and Systems, vol. E81-D, No. 9, Sep. 25, 1998, pp. 968-975, 1 page.
Abstract, Lewis, et al., "Wide-field-of-view star tracker camera," Proc. SPIE 1478, Sensors and Sensor Systems for Guidance and Navigation, vol. 1478, Jul. 1, 1991, conference at Orlando, Florida, Apr. 1, 1991, 2 pages.
Abstract, Malassiotis, et al., "Coding of video-conference stereo image sequences using 3D models," Signal Processing: Image Communication, vol. 9, No. 2, Jan. 1997, pp. 125-135, 1 page.
Abstract, Nickerson, et al., "The ARK project: Autonomous mobile robots for known industrial environments," Robotics and Autonomous Systems, vol. 25, Issues 1-2, Oct. 1998, pp. 83-104, 2 pages.

\* cited by examiner

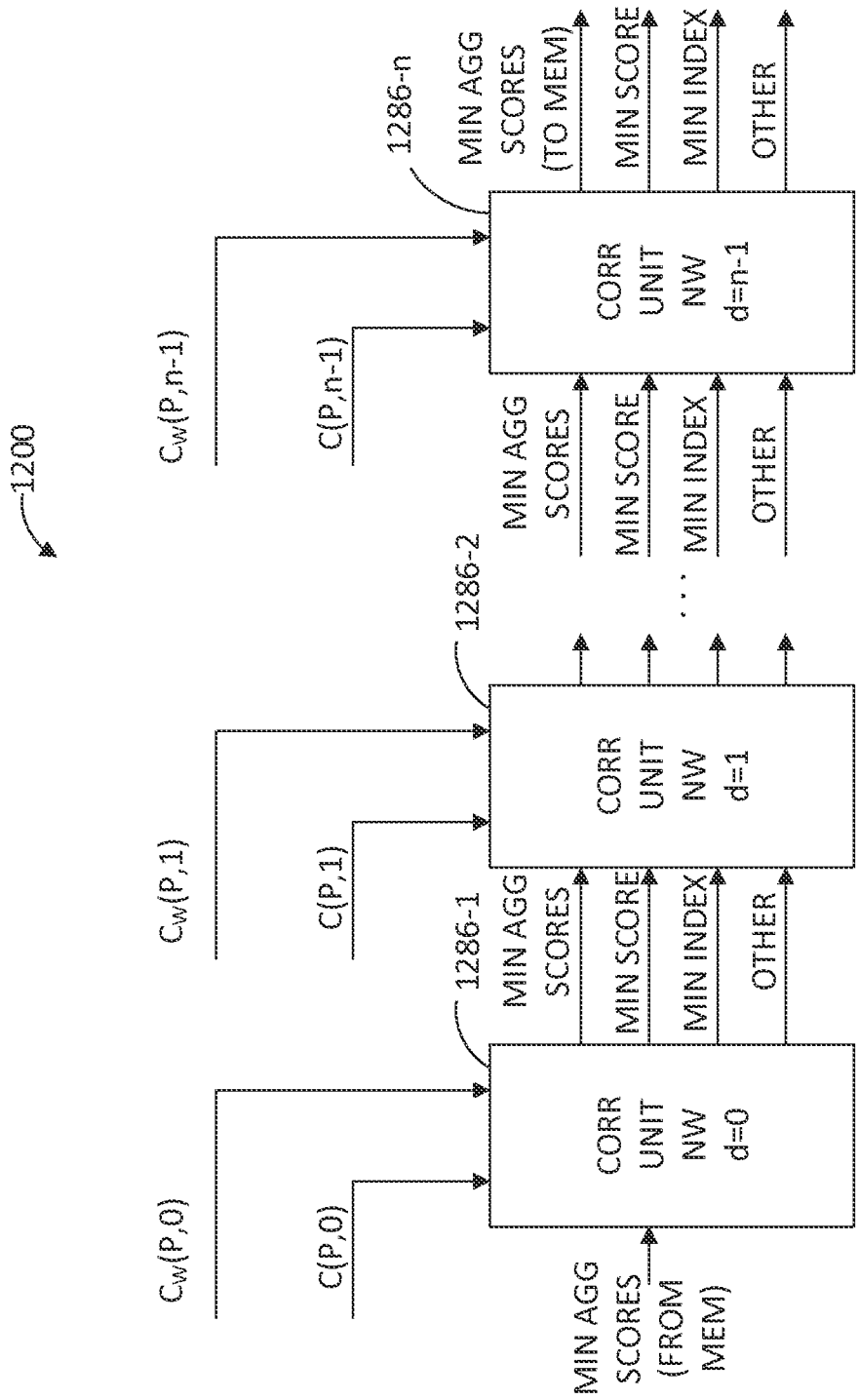

SYSTEMS AND METHODS FOR ROW CAUSAL SCAN-ORDER OPTIMIZATION STEREO MATCHING

BACKGROUND

A camera may produce radiometric measurements of the space within its field of view. It may periodically produce an image, or collection of these measurements. Each radiometric measurement may provide some information about the intensity, frequency and/or polarization of the electromagnetic waves traveling along a physical line, from a point on the line towards the camera at the time of the measurement. For example, a monochrome camera may produce measurements of the intensity of visible light traveling along a ray. A color camera may produce measurements R, G and B of the respective red, green and blue components of the visible light traveling along a ray.

Cameras may produce data in raster order, beginning data output at the upper left pixel, and progressing across the top row from left to right, then returning to the beginning of the next row, etc., until the bottom right pixel is reached. This sequence of pixels in raster order may he referred to as a stream of pixels, or a pixel stream. Each row of data can often be referred to as a scanline.

Stereo vision is the reconstruction of a three-dimensional (3D) structure in a 3D scene using two or more images of the 3D scene, each acquired from a different viewpoint. The images of the 3D scene may be obtained using multiple cameras or one moving camera. Two cameras are often used, termed binocular vision, which is similar to human vision through two eyes. With binocular vision, a stereo image is based on a left image as "seen" from a left camera (a perspective from the left) and a right image as "seen" from a right camera (a perspective from the right).

In image processing, more particularly computer vision, the term disparity refers to the difference in coordinates of similar features within left and right images of a stereo image. The disparity of features between the left and right images may be computed as a shift to the left (e.g., in pixels) of an image feature when viewed in the right image. If stereo images have lens distortion, or are not correctly aligned, image rectification may be performed to remove distortion and correct alignment of the images such that disparities exist only in the horizontal direction, Once rectified, stereo matching may be performed by a linear search for correspondence of features. For stereo matching, an algorithm may be used to scan the left and right images (i.e., process pixels of the images in a particular order) to search for matching image features. A pixel and one or more of its surrounding pixels in the left image are compared to all of the disparities in the right image by comparing corresponding pixel groups. Various metrics may be used for the comparisons. Using one of the metrics, the disparity with the best computed match is considered the disparity for the image feature. This minimum match score is an indication that the matched pixels correspond and hence the shift represents the disparity.

Stereo algorithms can be divided into those that can be done in one pass over the image data and algorithms that require multiple passes, One-pass algorithms tend to he the algorithms used for real-time applications due to their low computational cost and latency. These algorithms generally decide what the best disparity answer is for a pixel based upon a small amount of surrounding local image information. Multi-pass algorithms tend to aggregate information from all parts of the image and have tended to produce denser accurate results, but at considerable additional computational cost and latency.

BRIEF DESCRIPTION OF THE DRAWINGS/FIGURES

FIG. 12 is a logic diagram of a correlation pipeline that may he used to process stereo image pixels from north and west orientations, according to an embodiment.

Figure 13A:
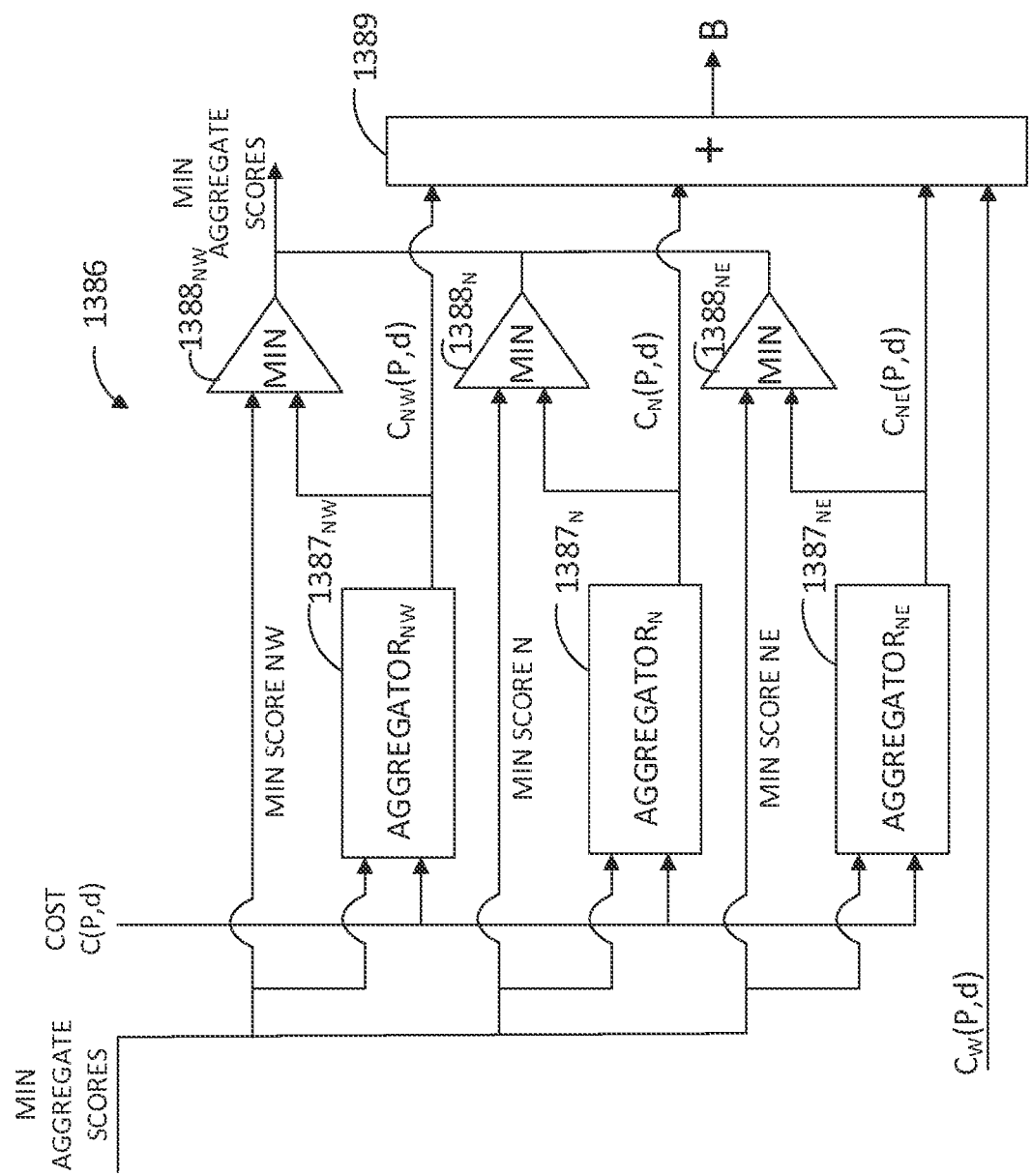

FIGS. 13A/B is a logic diagram of a correlator, such as a correlator from FIG. 12, according to an embodiment.

Figure 14:
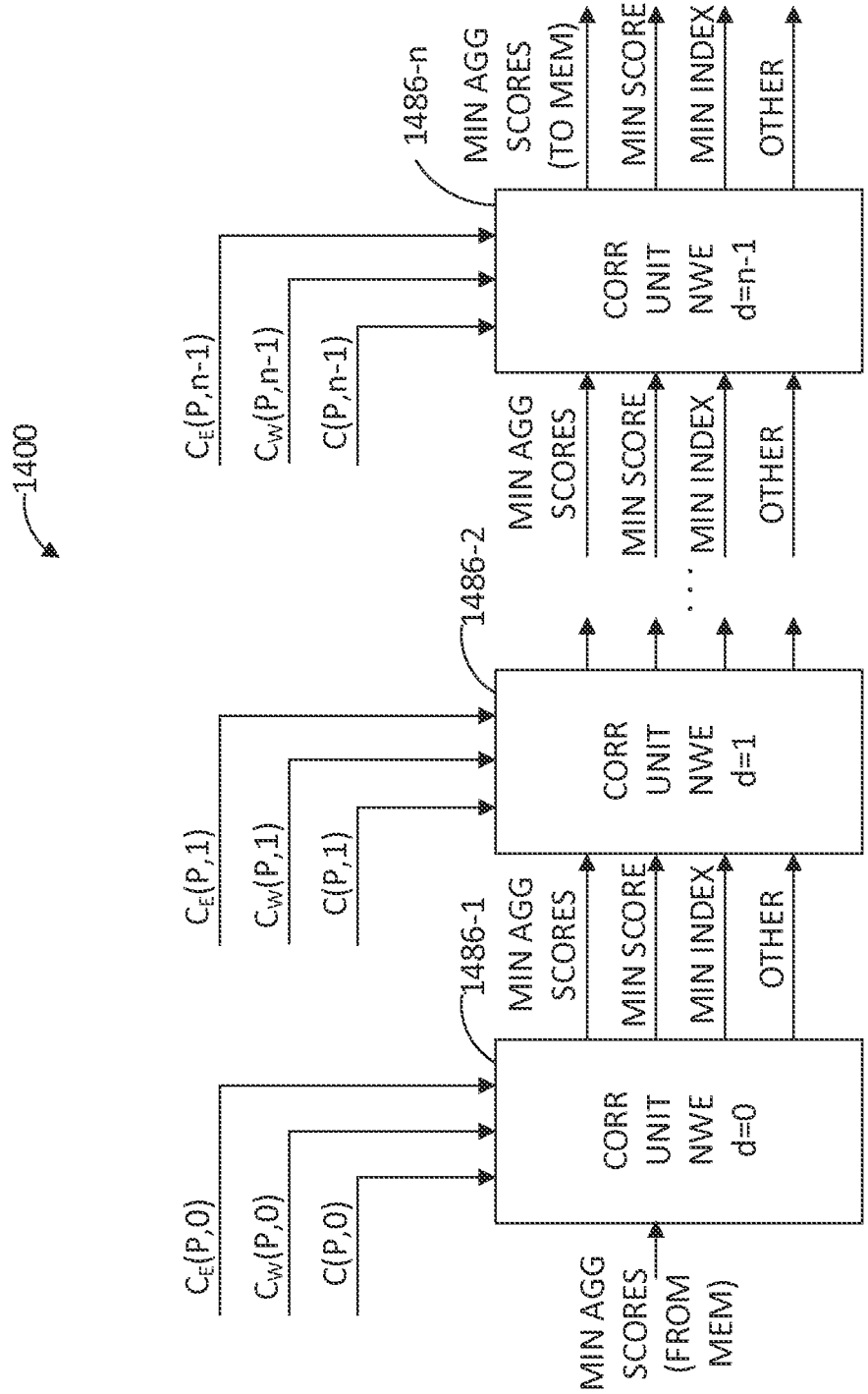

FIG. 14 is a logic diagram of a correlation pipeline that may be used to process stereo image pixels from north, west, and east orientations, according to an embodiment.

Figure 15:
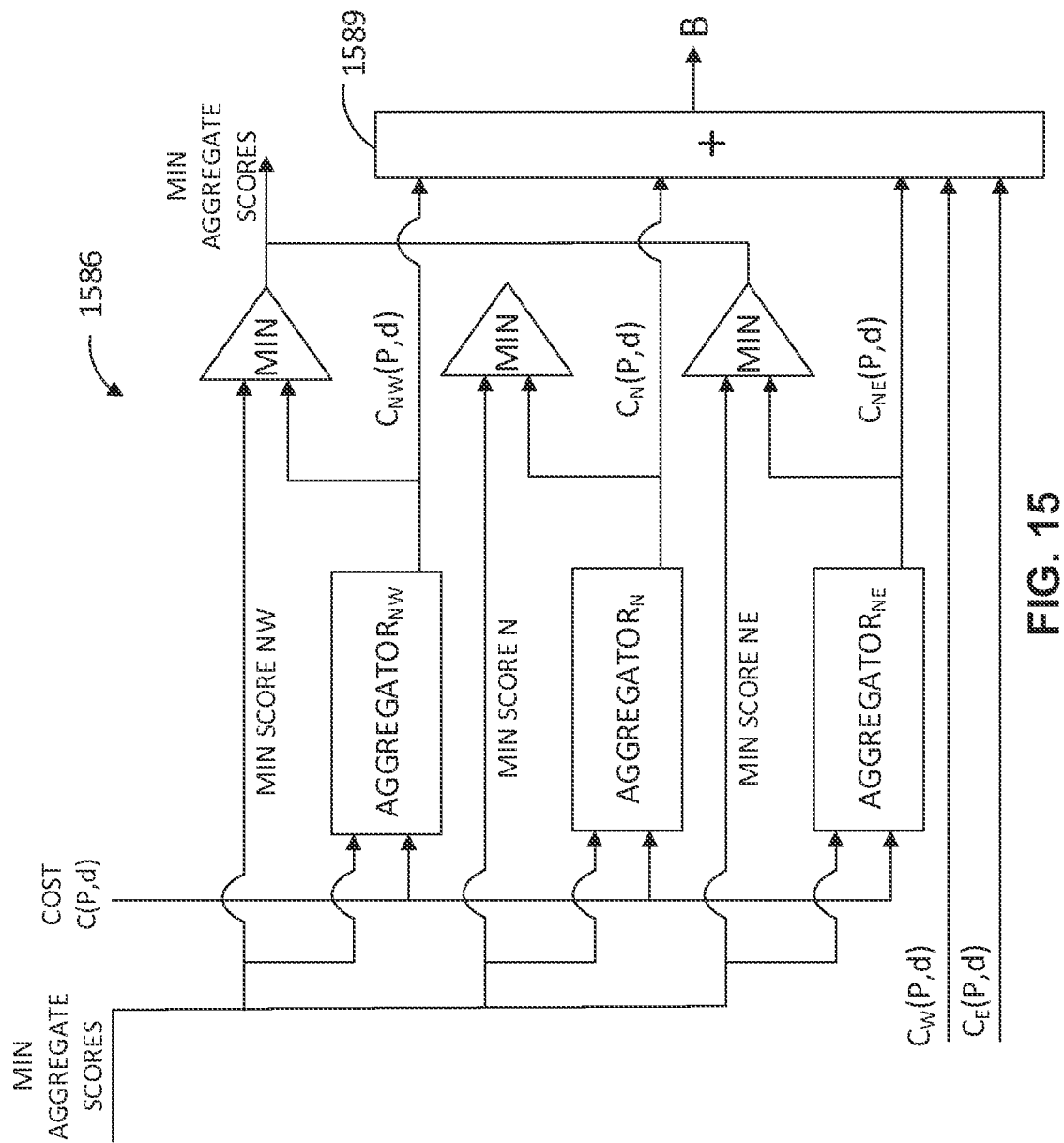

FIG. 15 is a logic diagram of a correlator, such as a correlator from FIG. 14 according to an embodiment.

Figure 16:
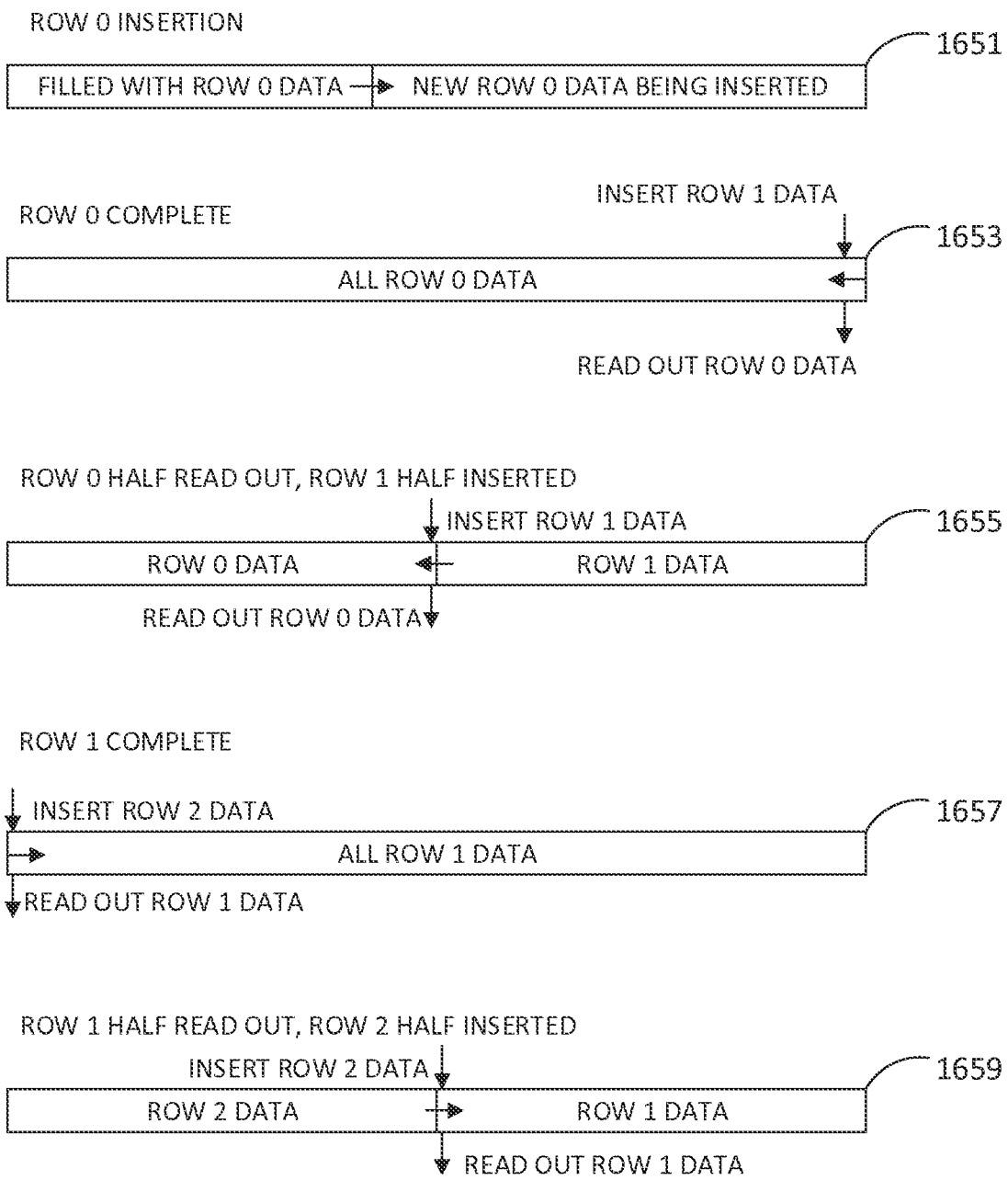

FIG. 16 depicts successive storage and reading out of scanline data in alternating directions, according to an embodiment.

Figure 17:
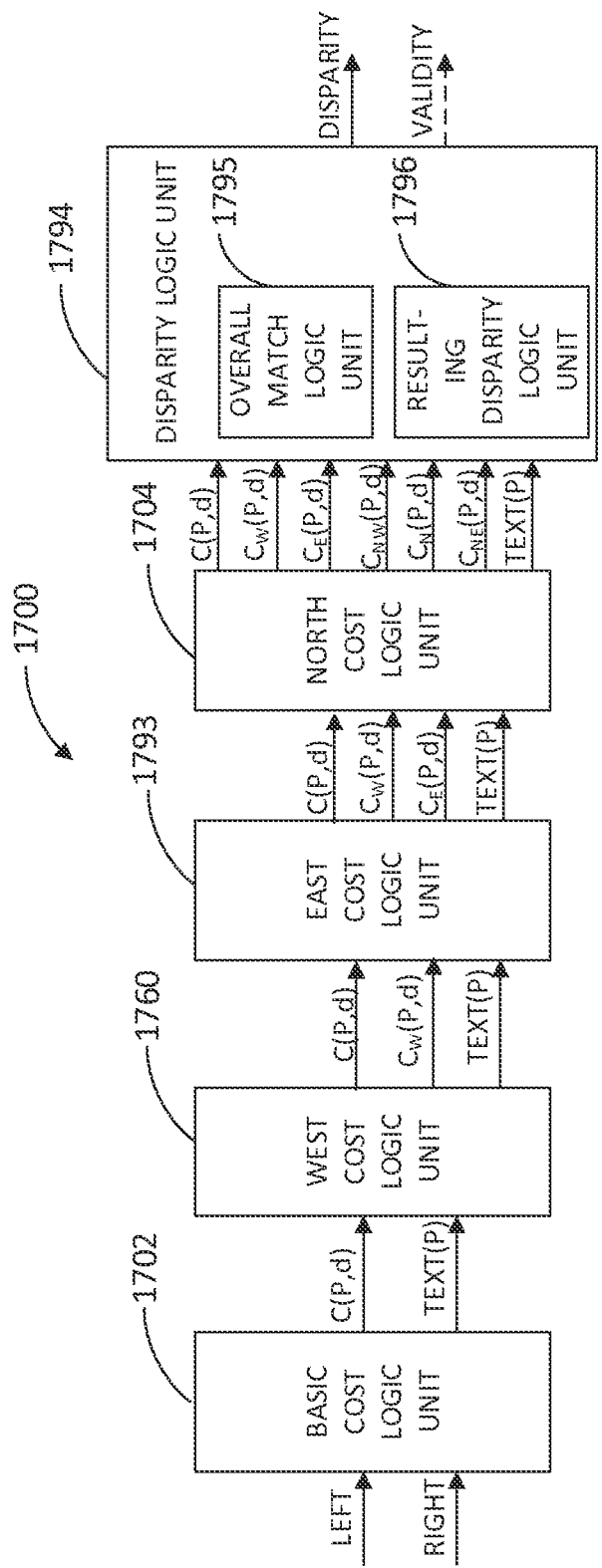

FIG. 17 is a block diagram of a system that may be used to determine a disparity map for a stereo image by processing pixels from west, east, and north orientations, according to an embodiment.

Figure 18:
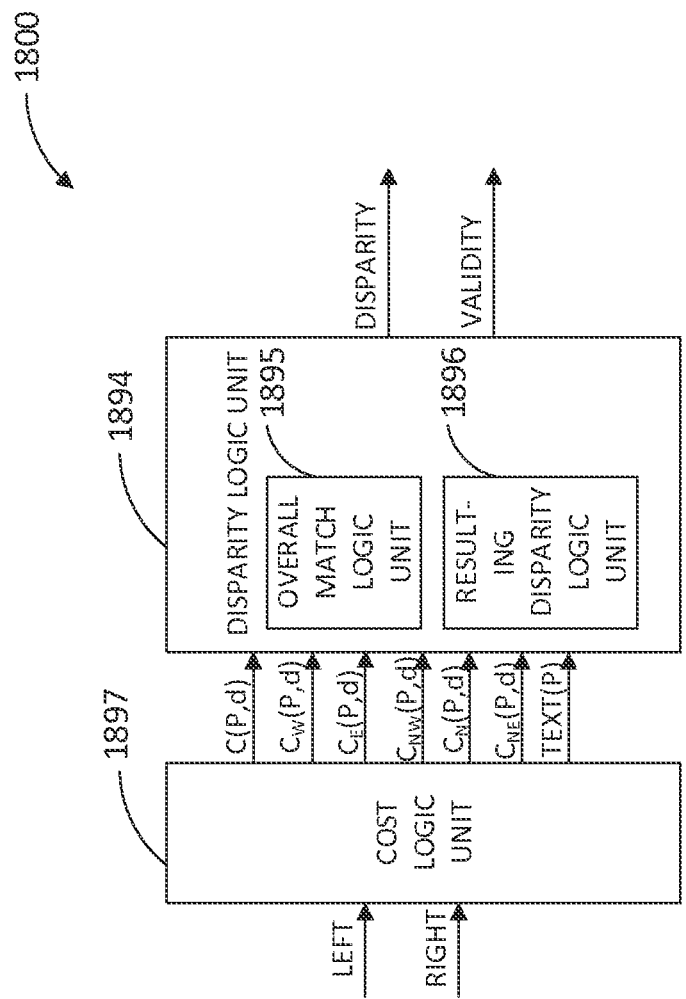

FIG. 18 is a block diagram of a system that may be used to determine a disparity map for a stereo image by processing pixels from west, east, and north orientations, according to an embodiment.

Figure 19:
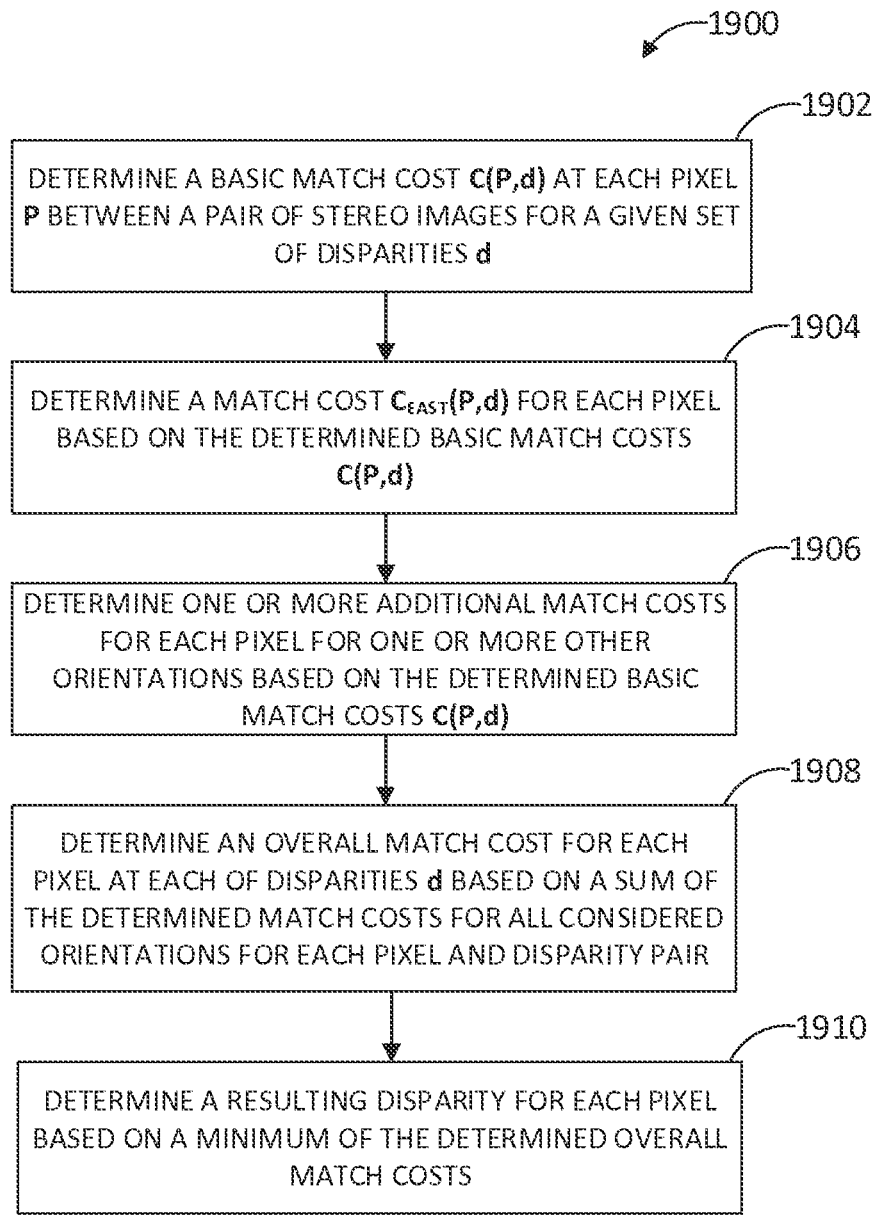

FIG. 19 is a flow chart illustrating a method of determining a disparity map, according to an embodiment.

Figure 20:
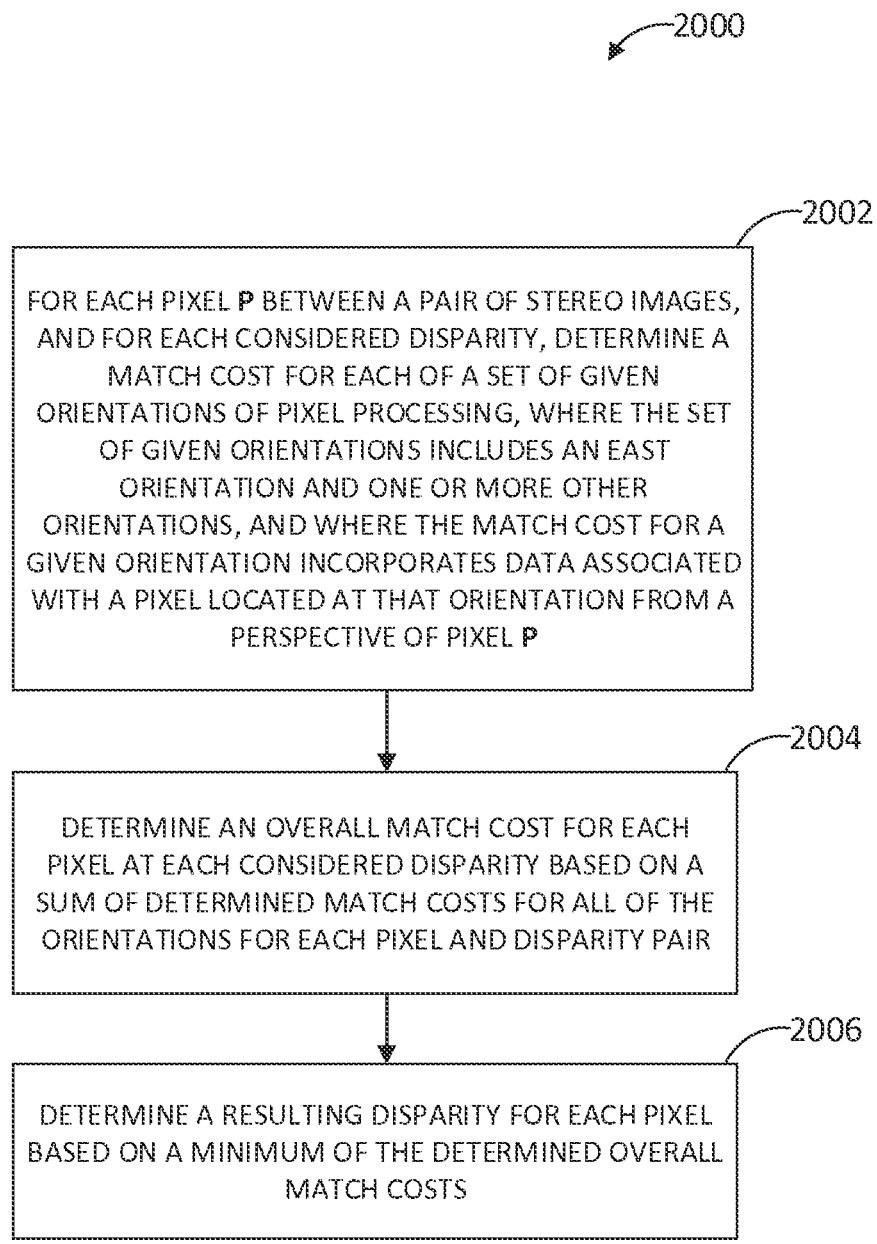

FIG. 20 is a flow chart illustrating another method of determining a disparity map, according to an embodiment.

Figure 21:
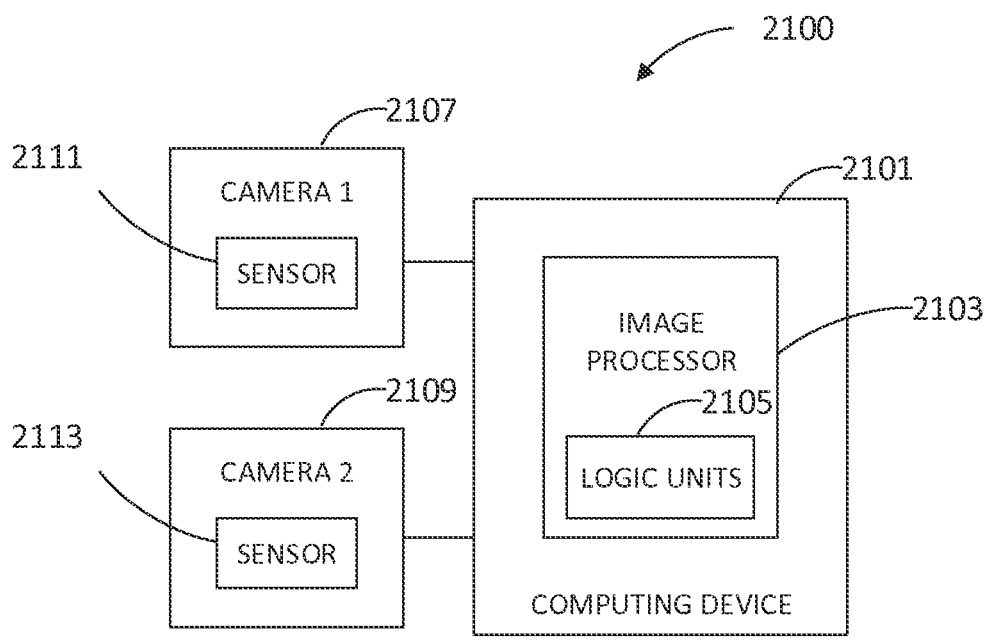

FIG. 21 is a block diagram of an exemplary system in which an embodiment ay be implemented.

Figure 22:
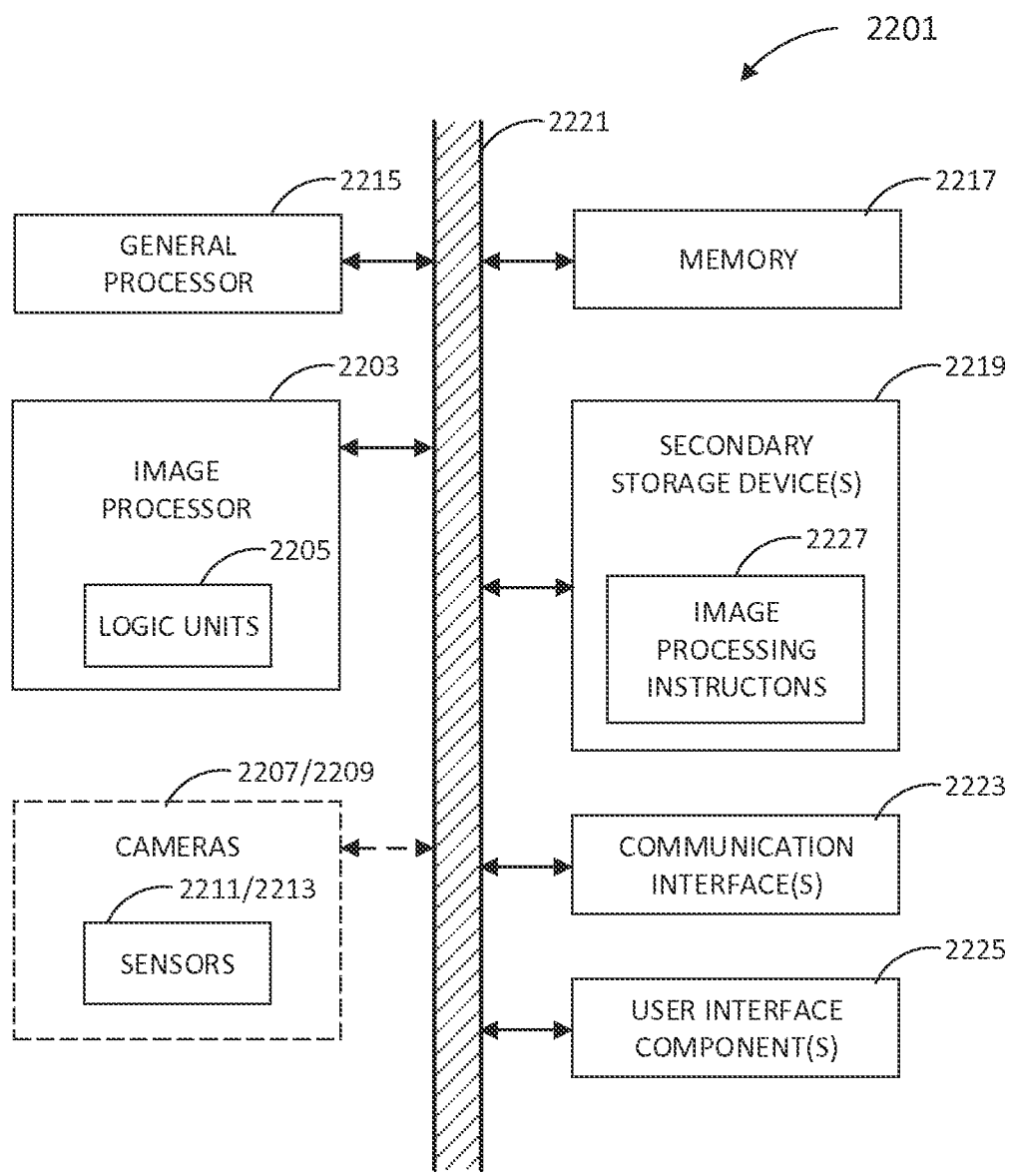

FIG. 22 is a block diagram of an exemplary device in which an embodiment may be implemented.

Figure 23:
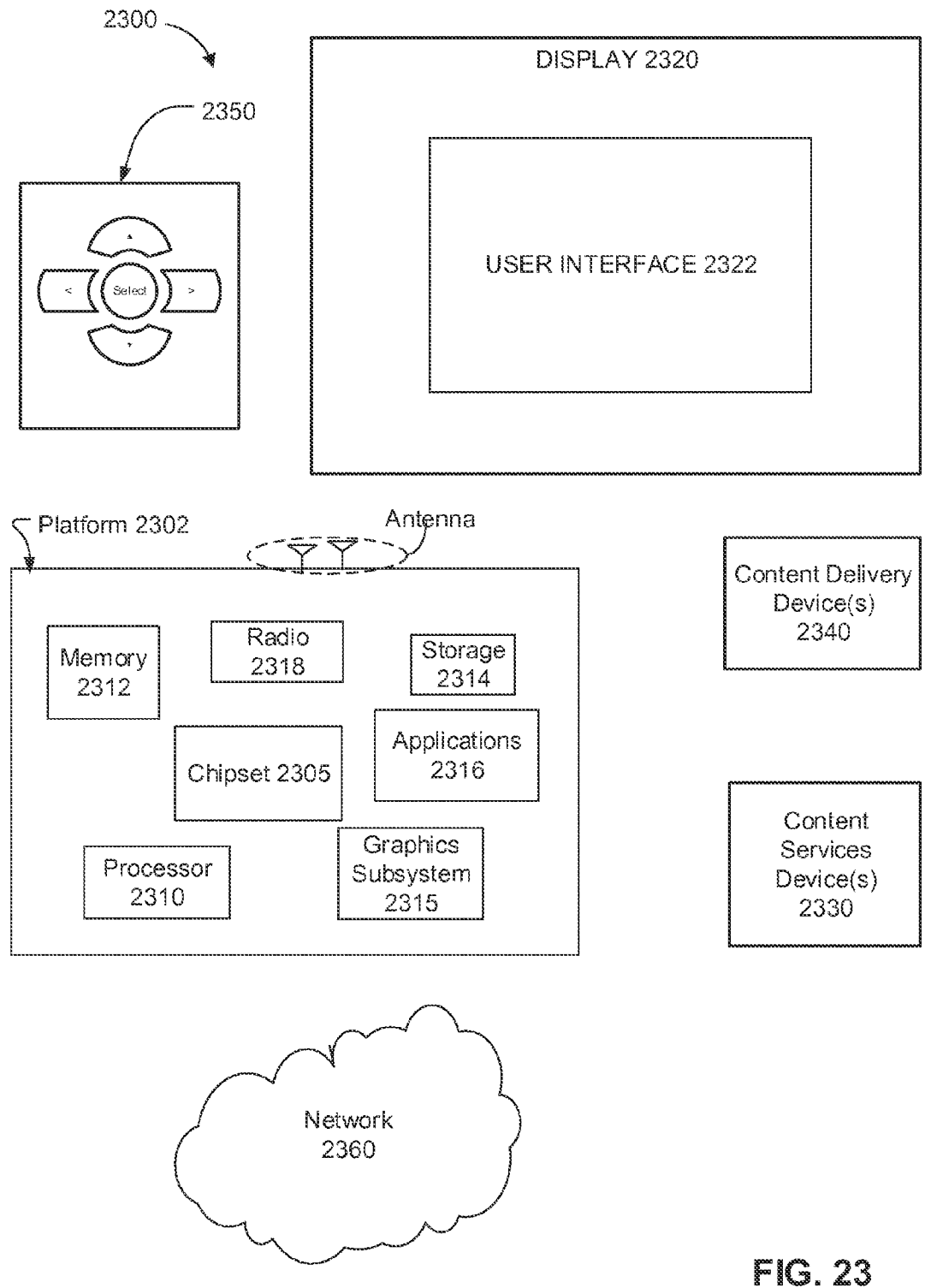

FIG. 23 illustrates an information system in which an embodiment may be implemented.

Figure 24:
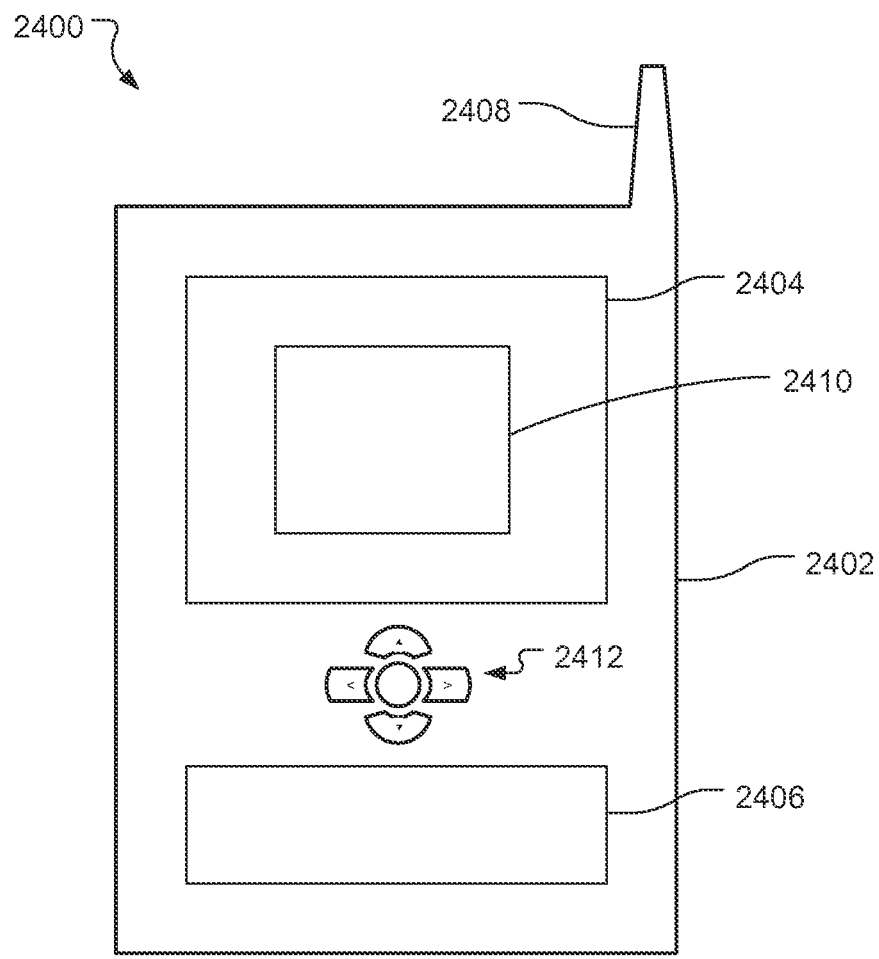

FIG. 24 illustrates a mobile information device in which an embodiment may be implemented.

Figure 25:
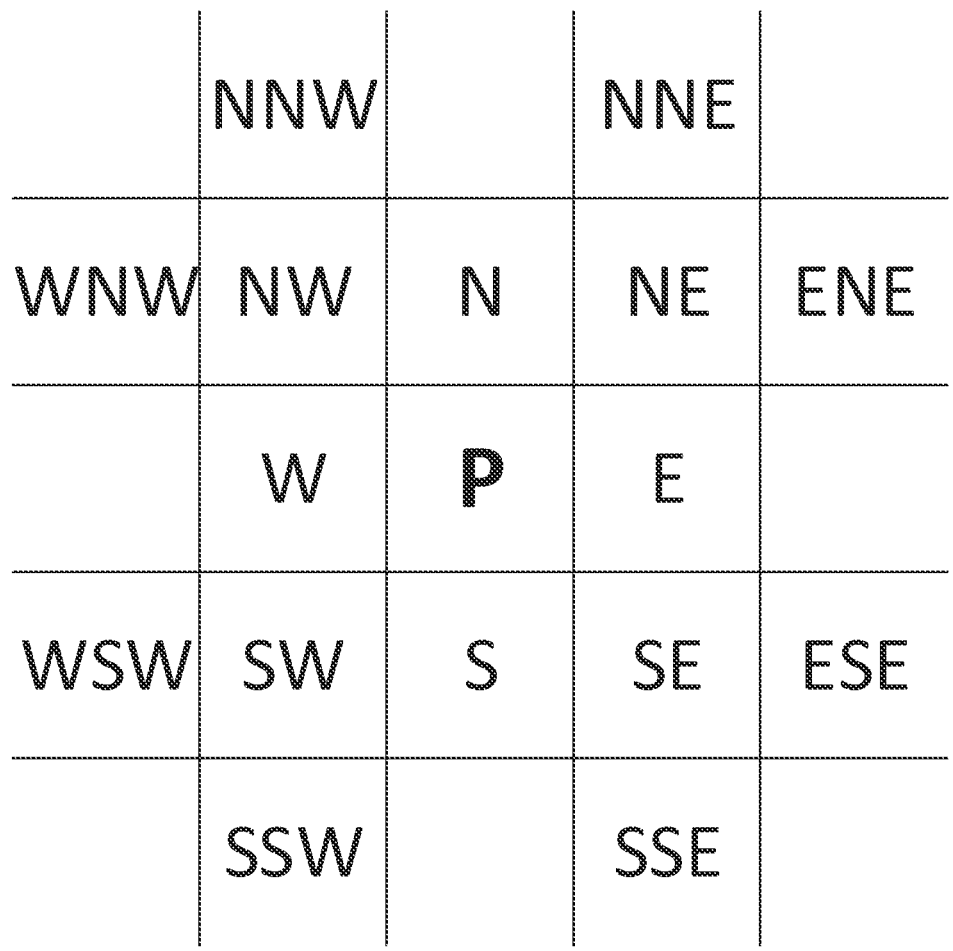

FIG. 25 illustrates an example grid of pixels showing orientation locations of pixels surrounding a given pixel.

In the drawings, the leftmost digit(s) of a reference number may identify the drawing in which the reference number first appears.

DETAILED DESCRIPTION

Determining stereo correspondence, whether in one pass or several, is a computationally intensive task. Because there is interest in using stereo depth in real time for interactive computer vision tasks, for example, various custom hardware-based solutions for computing stereo correspondence have been explored. The hardware implementations that have had the highest performance in number of disparity results per second and the least cost in terms of memory and gates have been one-pass algorithms.

Presented herein are approaches to stereo matching algorithms suited to fast hardware implementation that aggregate information from a broader area than the immediate intensities surrounding the pixel in question, yet may be utilized in a single pass over the image, with relatively small local storage. Previously demonstrated pipelined stereo architectures may be combined with scan-order optimization where the algorithm used is "causal." Thus, when choosing the best match for a pixel (or pixel window), the algorithm may only consider information from input data from the current pixel (or pixel window) and pixels (or pixel windows) occurring earlier on the current row, or in previous rows. The notion of "causal" may be generalized slightly to allow the decisions for a pixel (or pixel window) to include all pixels (or pixel windows) from the current row and above. This generalized notion may be termed "row causal."

At the heart of most stereo algorithms, there is a notion of a measure of dissimilarity between pixels in the left and right images of a stereo image. One such measure is a matching metric called the census metric. The dissimilarity of matching a pixel P in the left image with a. pixel at disparity d from this pixel may be denoted as C(P,d). Dissimilarity may also be called cost or score.

A simplified one-pass stereo algorithm may output a disparity, chosen in a bounded set of D possible values 0, . . . , D−1, that minimizes the dissimilarity. Using this algorithm, the output disparity at pixel P written d*(P), may be chosen such that $$C(P,d^*(P))=\min\{C(P,0),C(P,1),\ldots,C(P,D-1)\}, \quad \text{Eq. 1}$$

where D is the number of considered disparities. This may be written as:

$$d^*P = \text{minindex}/d\, C(P,d) \quad \text{Eq. 2}$$

A more complex family of stereo matching methods may exploit the fact that disparity changes mostly smoothly from one pixel to the next, except at depth boundaries. These methods are usually based on minimizing a combined measure of (1) the dissimilarity at each pixel, and (2) the discontinuity of the output disparity map. One common cost considered for a disparity map d(P), and the cost considered in this document, is the sum, at each pixel, of the dissimilarity C(P,d(P)) and of a penalty for discontinuity with each neighboring pixel P' of P. The considered penalty is zero if d(P)=d(P'); k1 if d(P)=d(P')+1 or d(P)d(P')−1; k2 if |d(P)−d(r)|>1, where k1 and k2 are two constants, with k2 greater than k1. The cost of a given disparity map d(P) may then be:

$$\text{sum}/P\, C(P,d(P)) + \text{sum}/n\, k1\,[|d(n)-d(P)|=1] + k2\,[|d(n)-d(P)|>1] \quad \text{Eq. 3}$$

where sum/P indicates a sum over all pixels in the image, sum/n indicates a sum over the neighboring pixels n of pixel P, |d(n)−d(P)| is the absolute value of the difference of d(n) and d(P), [X] is the indicator function (i.e., [X] is equal to one if statement X is true and zero if statement X is false).

One then strives to find a disparity map that minimizes this cost, However, finding a global minimum to this optimization problem is usually not possible in real-time, except in very limited cases. For this reason, methods that find approximate solutions to this optimization problem have been proposed. Among these proposed methods, many involve scan-order optimization, i.e., processing independently lines that run through the image, for example image rows, columns, diagonal lines, or lines following a knight's chess move (L-shaped). Scan-order optimization methods are also called "scanline optimization" methods; however, this use conflates the multiple scan orders of the optimization with the scanning of pixels out of the camera. In scan-order methods, the same cost as Eq. 3 above may be optimized, but only pixels in a given scan-order are considered. Processing with a single scan-order can introduce artifacts in the result, such as streaks along the orientation of the scan. For this reason, the method is often repeated with scan-orders of different orientations, so that streaks created for one orientation may be attenuated by the processing at another orientation.

The above-discussed methods that include several scan-orders have been done with multiple passes over an entire image. As a consequence, they cannot produce any output until the source data is entirely available and all but the last pass have been completed. In addition, these methods often require considerable storage, proportional to the image size multiplied by the number of considered disparities.

Row Causal Disparity Map Generation

To address the above-discussed limitations, systems and methods for determining a disparity map are presented that are row-causal such that rows (or columns, or scan-orders with any given orientation) of pixels may be processed in succession and the output at a given row may depend just on the previous rows. As a result, the latency of the system may be as small as a few rows, and the storage requirement may be optimized such that it is proportional to the size of a single input image scanline (in pixels, for example) multiplied by the number of considered disparities. This process may be described as a simultaneous execution of multiple single-pass scan-order optitnizations.

Embodiments of the systems and methods are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the scope of the description. It will be apparent to a person skilled in the relevant art that this can also be employed in a variety of other systems and applications than what is described herein.

The approaches described herein involve processing scan-orders at multiple orientations. For each orientation o of a set of orientations O, for each pixel P, and disparity d, the stereo matching cost for that orientation may be defined as:

$$C_o(P,d) = C(P,d) + \min[C_o(P_o,d),\, C_o(P_o,d-1)+k1,\, C_o(P_o,d+1)+k1,\, \min/x\, C_o(P_o,x)+k2] - \min/y\, C_o(P_o,y) \quad \text{Eq. 4}$$

where $P_o$ denotes the pixel in orientation o from P, k1 and k2 are additional penalty costs, O is a selected set of orientations, and x and y each represent the range of considered disparities. An overall matching cost $C^*(P,d)$ may then be the sum for all orientations o of the set of orientations O of $C_o(P,d)$, and the resulting disparity for each pixel is the disparity with minimum $C^*(P,d)$ for all disparities: minindex/d $C^*(P,d)$.

For clarification, a discussion of orientations o may be appreciated, and may be accomplished with reference to the example shown in FIG. 25. FIG. 25 shows an example grid of pixels with a pixel P shown in the center. A location of a pixel P in relation to pixel P may be denoted using compass designations, as shown in FIG. 25, in replacement of the "$_o$." For example, a pixel $P_{NW}$ is the pixel located in the block designated "NW", which denotes the location of pixel $P_{NW}$ from the perspective of pixel P. The immediate neighbor pixels have simple compass designations, but one could include additional orientations, such as the "knight's move" orientations, which are two pixels in any direction from pixel P, followed by one pixel in a perpendicular direction, as is done when moving a knight in a game of chess. These could also be referred to as NNW, WNW, NNE, ENE, ESE, SSE, SSW, WSW, as shown in FIG. 25.

Returning to the discussion of disparity map generation, in order to compute both $C_S(P,d)$ (i.e., the scan-order optimization of a pixel including data from the south (S)) and $C_N(P,d)$ (i.e., the scan-order optimization of a pixel including data from the north (N)), at least two passes over an entire image would be required. If processing an image in conventional left-to-right, top-to-bottom order, $C_N(P,d)$ may easily be computed from data gathered while processing prior pixels, while at any pixel P, $C_S(P,d)$ cannot be known, as none of the values $C_S(P_S,d)$ will be known since $P_S$ would not have been seen yet. Thus, since a single pass over an image is more desirable, an algorithm that includes data from the south (such as, for example, any pixel below the row that contains pixel P in the example shown in FIG. 25) is to be avoided.

There are three natural variants of one-pass scan-order optimization algorithms that may be used. Each variant suggests a slightly different architecture for efficient implementation. First, a "North" example algorithm may consider only orientations from previous rows of an image, for example pixels at the northwest (NW), north (N), and/or northeast (NE) positions from a pixel P, or orientations including knight's moves above the current row (e.g., the L-shaped moves described earlier with reference to FIG. 25 that are above the current row). It is clear to one skilled in the art that data from these orientations may be easily included in a computation as the inputs $C_o(P_o,d)$ and min/j $C_o(P_o,j)$ may all be computed when the previous row is being processed and can be stored for subsequent use in a single row of storage.

Second, a "North and West" example algorithm (which, herein, may also be considered the "West" example for simplicity) may consider a west (W) orientation in addition to the NW, N, and/or NE orientations. With this algorithm, computing $C_W(P,d)$ is slightly more complicated than in the North algorithm, as immediate inputs min/j $C_W(P_W,j)$ would not be known until all disparities for the previous pixel $P_W$ have been considered. Previously known pipelined stereo hardware has done the disparity computation in an overlapped manner such that all disparities for a pixel could not be considered before the first disparity for the next pixel is considered.

A third example algorithm may consider an east (E) orientation in addition to the NW, N, NE, and/or W orientations. Herein, this algorithm may be called the "Non-South" example (or the "East" example for simplicity). To compute $C_E(P,d)$, all pixels in a row need to be processed before $C_E(P_E,$ d) can be known for any pixel in that row. The definition of "one pass" may be relaxed if the input rows are looked at monotonically. When performing a right-to-left pass on the row, the same sort of dependency on the immediately previous pixel occurs for computing $C_E(P_E,d)$ as occurs when computing $C_W(P_W,d)$.

The architectures for the above algorithms will now be described.

North Example

Figure 1:
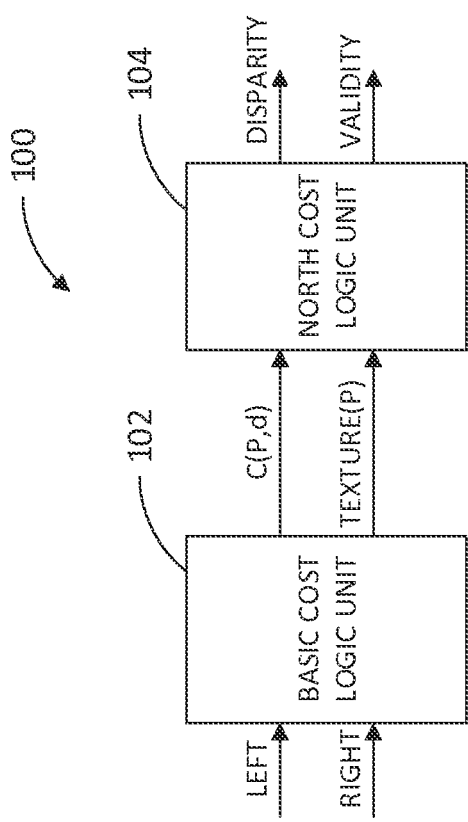
FIG. 1 is a block diagram of a system that may be used to determine a disparity map for a stereo image by processing pixels from a north orientation, according to an embodiment.

FIG. 1 is a block diagram of a system 100 that may be used to determine a disparity map for a stereo image by incorporating information computed for pixels from the north, which may include the northwest (NW), north (N), and northeast (NE) orientations, according to an embodiment. In this example, the NW, N, and NE orientations are all considered. This was done by way of example and ease of discussion only, and not to be limiting. As would be understood by those of skill in the art, any one or more of these orientations may be considered, as well as alternative orientations such as the knight's move orientations described earlier (e.g., WNW, NNW, NNE, and/or ENE). As can be seen in FIG. 1, data from left and right images of a stereo image may be provided to basic cost logic unit 102, which may determine basic costs C(P,d) and provide basic costs C(P,d) and optionally texture information to a north cost logic unit 104. North cost logic unit 104 may compute $C_{NW}(P,d)$, $C_N(P,d)$, and $C_{NE}(P,d)$, discussed in more detail below. As also discussed below, north cost logic unit 104 (or alternatively additional logic units (not shown)) may also compute an overall match cost $C^*(P,d)$, along with, for example, minimum score(s), a minimum index, and optionally validity information, and may output an optimal disparity and optionally validity information. Although for each pixel, a disparity (or set of disparities) with minimum matching cost will exist, not all of these "best" disparities will correspond to the imaged scene. Evaluations of the amount of distinctive texture in the source images, as well as properties of the computed costs, and match consistency may be used to evaluate the plausibility of individual disparity estimates.

Figure 2:
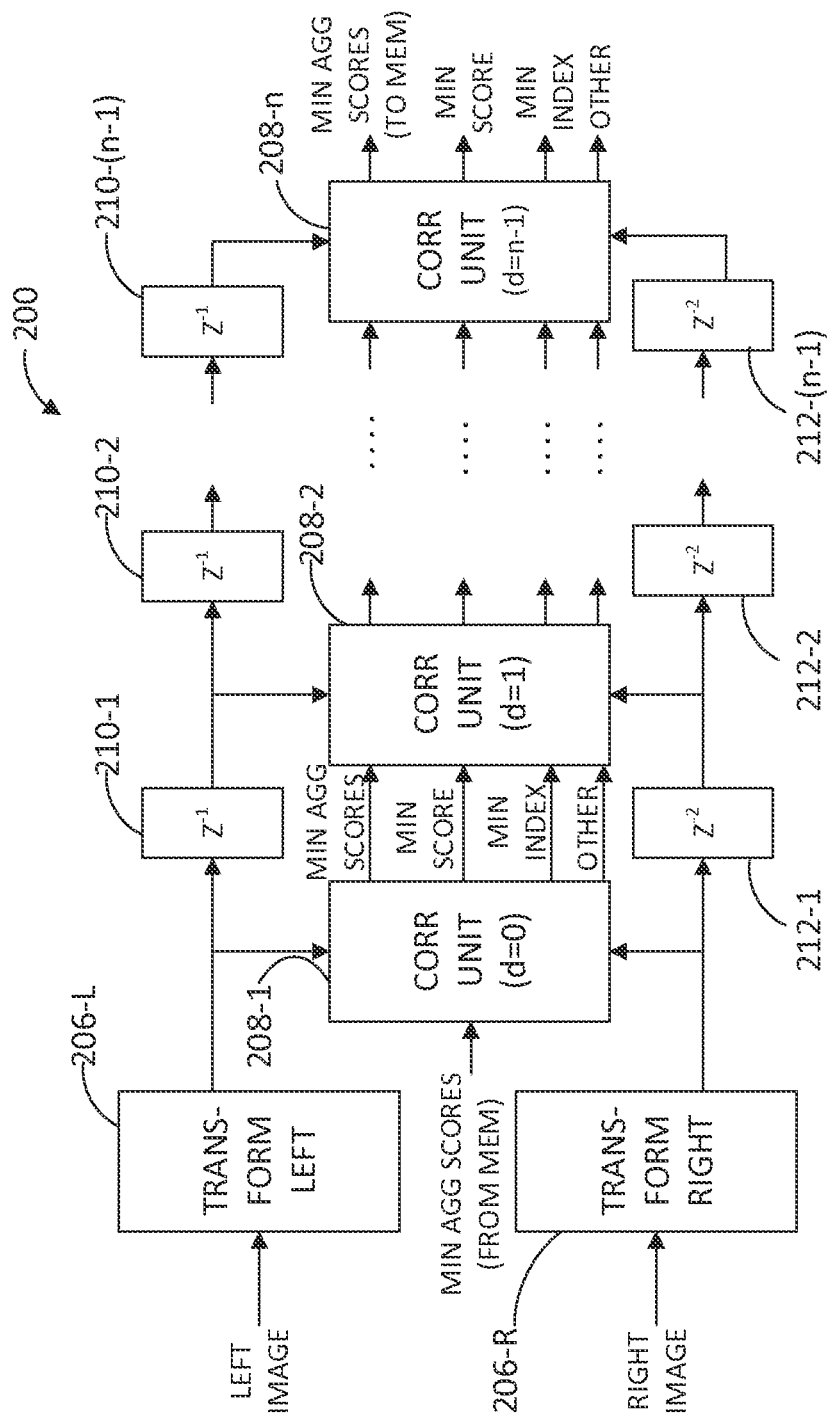
FIG. 2 is a logic diagram of a pipeline architecture that may be used to process stereo image pixels from a north orientation, according to an embodiment.

In greater detail, the North example may be implemented as shown in FIGS. 2-5. FIG. 2 depicts logic diagram of a stereo pipeline 200 in which left and right images of a stereo image may be transformed via transform units 206-L and 206-R, respectively, and differentially delayed via delay units 210-1 to 210-(n-1) and 212-1 to 212-(n-1), respectively, along a main pipeline, allowing successive computation of match costs via correlation units 208-1 to 208-n and sequential minimization of these match costs, An input into pipeline 200 may include minimum aggregate scores, which may be provided from a memory. Pipeline 200 may output a minimum score (i.e., minimum cost), minimum index (i.e., disparity), and optionally other outputs that may include, for example, texture measures and other measures useful for determining validity of a match. In addition, pipeline 200 may output minimum aggregate scores to the memory. Transform units may just pass images through, or may compute transforms such as the census transform.

Figure 3:
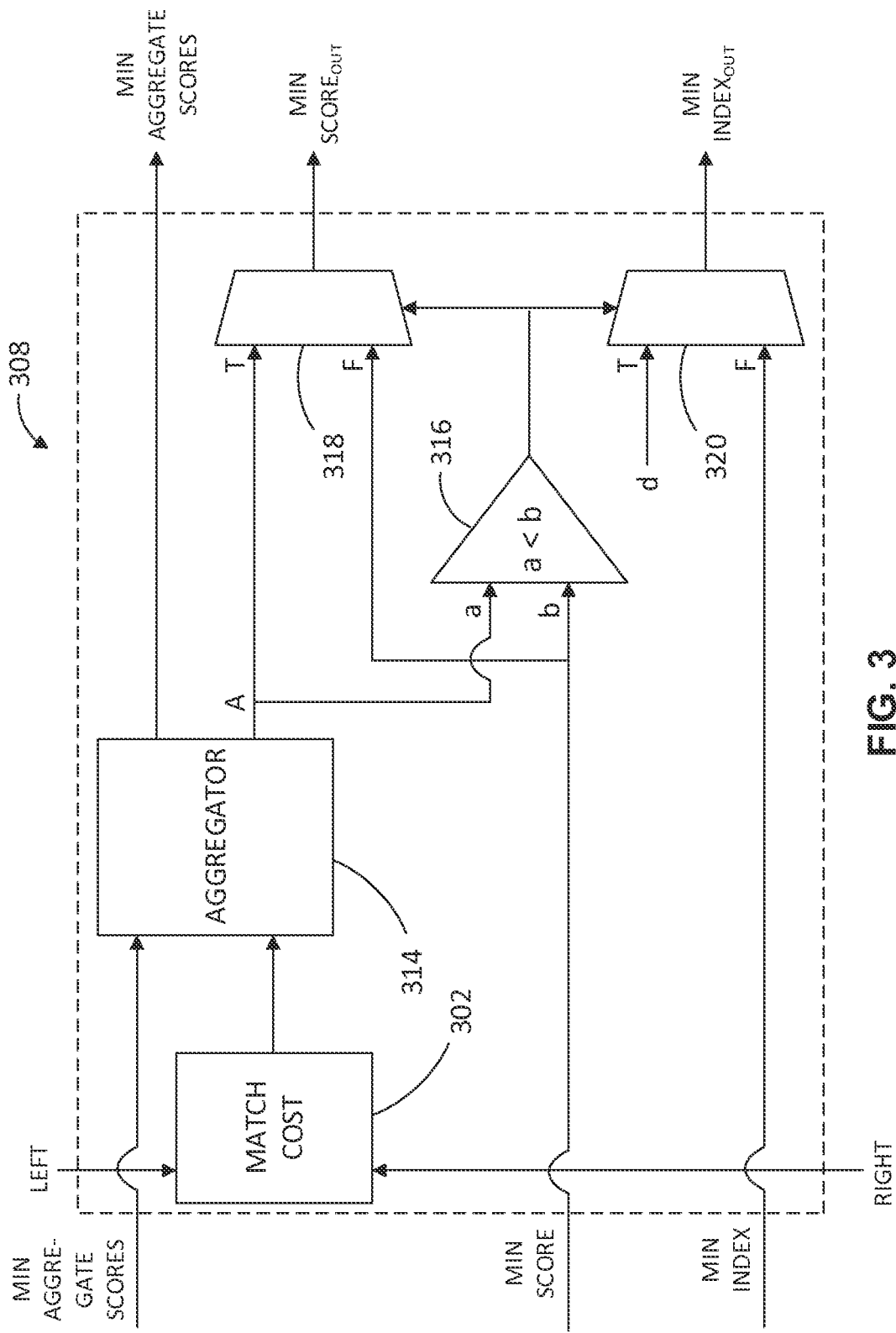
FIG. 3 is a logic diagram of a correlator, such as a correlator from FIG. 2, according to an embodiment.

FIG. 3 depicts a logic diagram of a correlator unit 308, which may represent any correlator unit from FIG. 2, according to an embodiment. Correlator 308 may include a match cost unit 302, an aggregator 314, a comparator 316, and multiplexors 318 and 320. Match cost unit 302. may determine a basic match cost that may be provided to aggregator 314 along with current minimum aggregate scores for determining further minimum aggregate scores and a combined aggregate score (shown as "A") that is the sum of the scores determined at each orientation NW, N, and NE. In a classical sense of pipelined stereo hardware, aggregator 314 would be the identity function, and a bus for the current minimum aggregate scores would have zero width (i.e., these components disappear; the aggregator would simply pass the match cost on to its output A, and the minimum aggregate score lines do nothing, as in the old model). Combined aggregate score "A" may be compared to a current minimum score at comparator 316 to determine if combined aggregate score "A" is less than the current minimum score, and the output (0 or 1) may be used as the selector input to each of multiplexors 318 and 320. Multiplexor 318 may output the minimum of combined aggregate score "A" and the current minimum score. Multiplexor 320 may output a minimum of a current disparity d and a current minimum disparity (shown in FIG. 3 as "min index").

Figure 4:
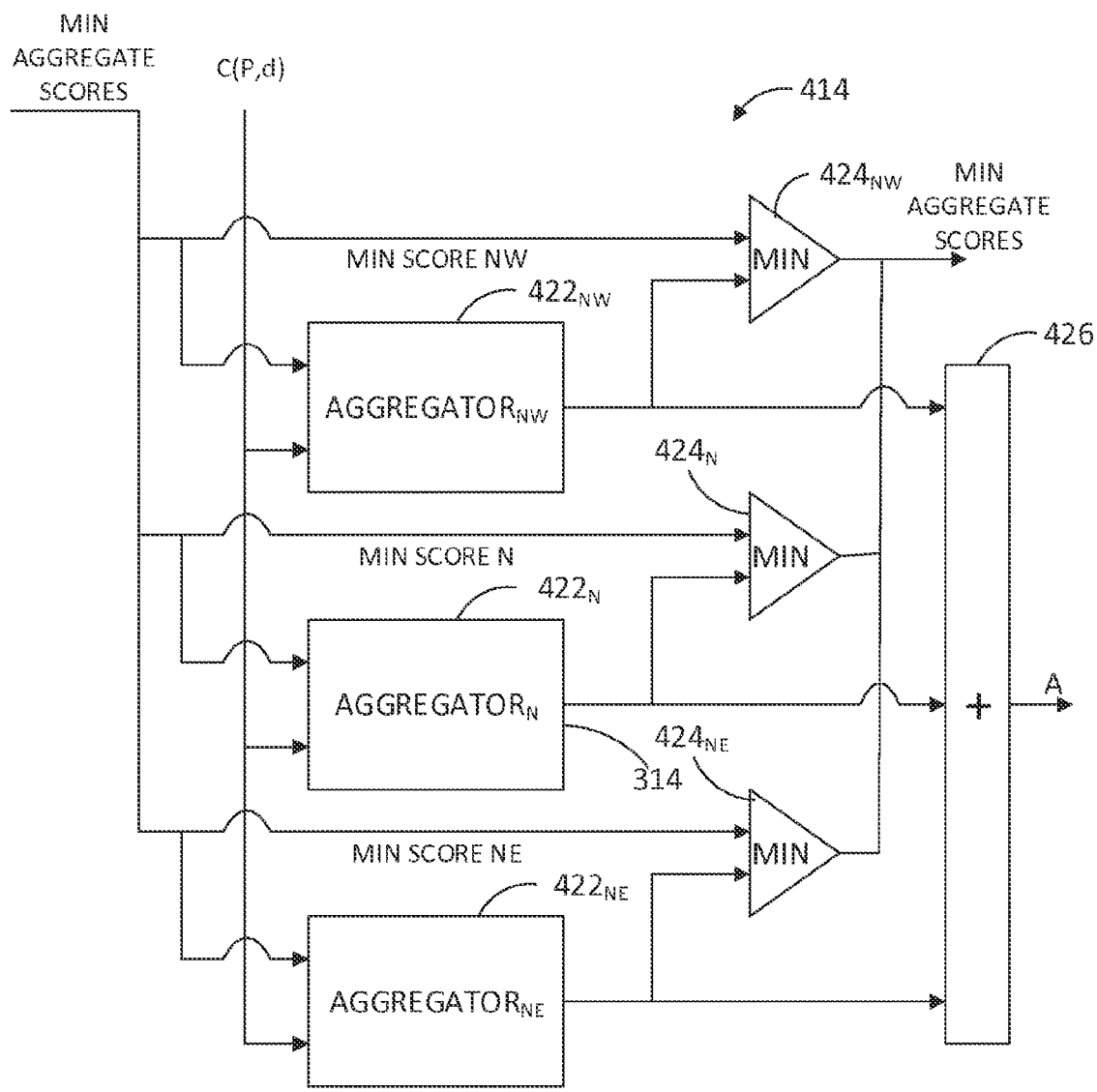
FIG. 4 is a logic diagram of an aggregator, such as an aggregator from FIG. 3, according to an embodiment.
Figure 5:
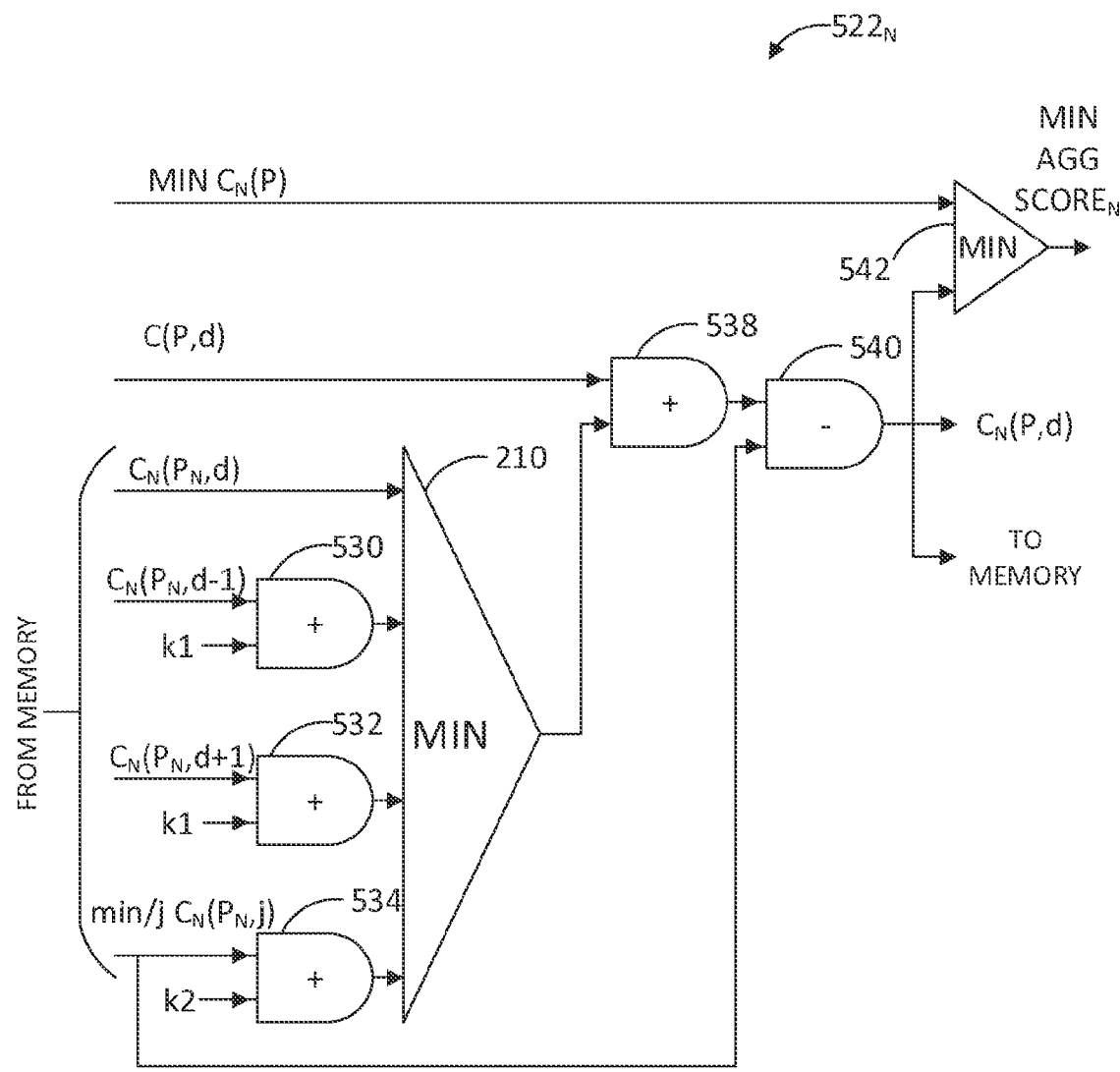
FIG. 5 is a logic diagrams of an aggregator, such as Aggregator$_N$ from FIG. 4, according to an embodiment.

FIG. 4 depicts a logic diagram of an aggregator 414, which may represent an aggregator such as aggregator 314 of FIG. 3, according to an embodiment. Aggregator 414 may include an aggregator $422_{NW}$, an aggregator $422_N$, and an aggregator $422_{NE}$. Aggregators $422_{NW}$, $422_N$, and $422_N$F may each determine and output respective costs $C_{NW}(P,d)$, $C_N(P,d)$, and $C_{NE}(P,d)$ based on basic match cost $C(P,d)$ and the minimum aggregate score at the respective orientation. Each of determined costs $C_{NW}(P,d)$, $C_N(P,d)$, and $C_{NE}(P,d)$ may be compared, at respective comparators $424_{NW}$, $424_N$, and $424_{NE}$, to a current minimum score for the respective orientation to determine a new minimum score for each respective orientation. Determined costs $C_{NW}(P,d)$, $C_N(P,d)$, and $C_{NE}(P,d)$ may also be summed at adder 426 and output as combined aggregate score "A" as described with reference to FIG. 3.

In an embodiment, the computations of $C_{NW}(P,d)$, $C_N(P,d)$, and $C_{NE}(P,d)$ are all very similar, but involve slightly different indexing for their memory accesses. As would be understood from the above description, the aggregator unit 414, for the North example, consists of three aggregators for the three orientations (NW, N, and NE) and an adder to compute the sum of their results. At the end of the pipeline, the values of the new minimum score for each orientation (i.e., min/k $C_{NW}$(P,k), min/k $C_N$(P,k), and min/k $C_{NE}$(P,k)) may be taken from the minimum aggregate scores bus and stored in memory. For the sake of example, the computation of $C_N$(P,d) will now be discussed. As stated above, the computations of $C_{NW}$(P,d) and $C_{NE}$(P,d) would be similar, but would involve slightly different indexing for the memory accesses. It would he understood by those of skill in the art how to compute $C_{NW}$(P,d) and $C_{NE}$(P,d) based on the description that follows for $C_N$(P,d). In particular, the case of $C_{NW}$(P,d) involves accessing a stored value computed in the previous row and one column earlier, while $C_{NE}$(P,d) involves accessing a stored value computed in the previous row and one column later.

The following algorithm may be used to determine $C_N$(P, d). In this algorithm, $P_N$ may refer to a pixel in the same column but previous row as pixel P, and $C_N(P_N,d)$ may refer to a computation done at the same pixel on the previous row.

$$C_N(P,d)=C(P,d)+\min[C_N(P_N,d), C_N(P_N,d-1)+k1, C_N(P_N,d+1)+k1, C_N(P_N,j)+k2]-\min/k\ C_N(P_N,k) \quad \text{Eq. 5}$$

If the aggregation unit (e.g., aggregator $422_N$) has enough storage for one entry per pixel in a row consisting of $C_N(P_N,d)$ for all disparities plus one entry for min/j $C_N(P_N,j)+k2$, ignoring the case of the first row, then computing $C_N(P,d)$ for a particular disparity d may be straightforward. Values for $C_N(P_N,d)$, $C_N(P_N,d-1)$, k1, $C_N(P_N,d+1)$, min/j $C_N(P_N,j)$, and k2 may be looked up, and the minimum computed. The input cost $C(P,d)$ may be added, and the value of minlk $C_N(P_N,k)$ may be subtracted. The minimum min/k $C_N$(P,k) may be computed in the correlator pipeline using the minimum aggregate scores bus shown in FIG. 3, and may be stored for access on the next row, where it may be accessed as min/j $C_N(P_N,j)+k2$. In this embodiment, disparity zero (0) does not include a cost $C_N(P_N, d-1)$, while the last correlator does not include a cost $C_N(P_N,d+1)$. At the first row of the image, the entries of $C_N(P_N,d)$ and min/j $C_N(P_N,j)+k2$ are not included in the computation or are initialized to zero. A structure for the above-described algorithm to determine $C_N$(P,d) may be seen in FIG. 5, which shows an aggregator $522_N$ using adders 530, 532, and 534, comparator 210, adders 538 and 540, and comparator 542. The computed $C_N$(P,d) may also be stored in memory.

North and West Example

Figure 6:
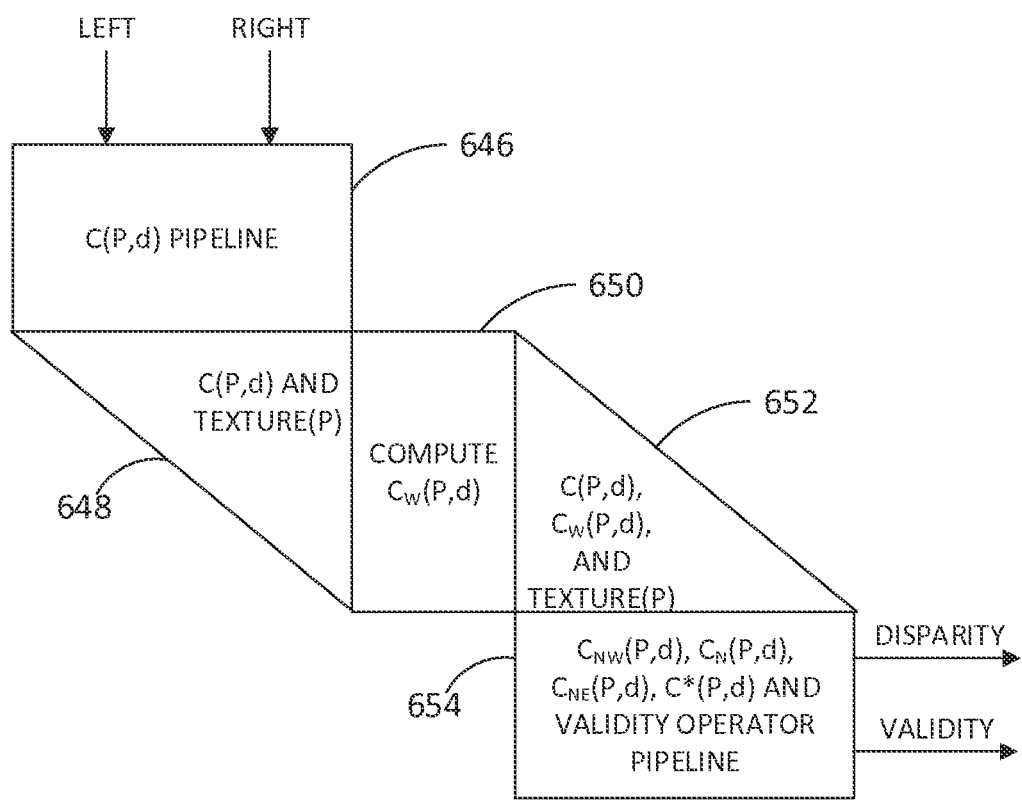
FIG. 6 is a block diagram showing computation flow that may be used to process stereo image pixels from west and north orientations, according to an embodiment.
Figure 7:
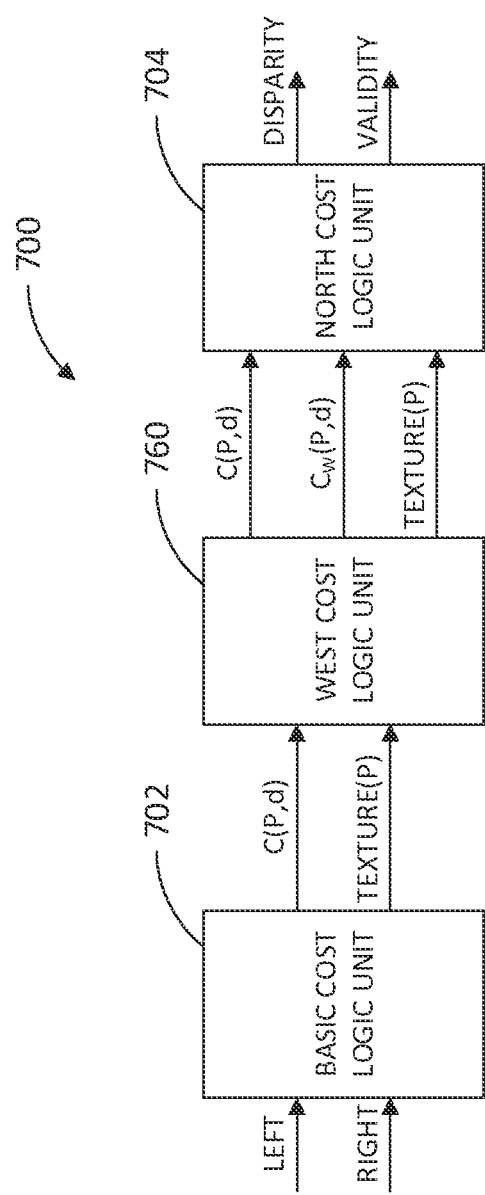
FIG. 7 is a block diagram of a system that may be used to determine a disparity map for a stereo image by processing pixels from west and north orientations, according to an embodiment.

In the "North and West" example, irr addition to one or more of the noorthern orientations discussed above, a west orientation is also considered. In this example, the structure may be rearranged such that min/k $C_W$(P,k) may be computed in one pixel-clock time (i.e., costs for all disparities for a pixel may be computed before costs for the next pixel are considered). The block diagram of FIG. 6 shows an example flow of this algorithm, according to an embodiment. Data from left and right images of a stereo image enter a basic match score (C(P,d)) pipeline at 646. Match scores for an entire search window may he presented in parallel to the unit that computes $C_W$(P,d) at 648, optionally along with other data such as texture data, and $C_W$(P,d) is computed in one pixel-clock time at 650. Values for C(P,d) and $C_W$(P,d), along with optional other data such as texture data, may be appropriately delayed and passed, at block 652, into a pipeline at block 654 that computes $C_{NW}$(P,d), $C_N$(P,d), $C_{NE}$(P,d), and an overall match cost C*(P,d), along with, for example, minimum score(s), a minimum index, and validity information. From this pipeline, an optimal disparity and optionally validity information may be output. The "North and West" example may similarly be depicted as shown in block diagram 700 of FIG. 7, where data from left and right images of a stereo image may be input to a basic cost logic unit 702, which may output basic match costs C(P,d) and optionally texture information to a west cost logic unit 760. West cost logic unit 760 may output C(P,d), $C_W$(P,d), and optionally texture information to a north cost logic unit 704, which may compute $C_{NW}$(P,d), $C_N$(P,d), and $C_{NE}$(P,d). North cost logic unit 704 (or alternatively additional logic units (not shown)) may also compute an overall match cost C*(P,d), along with, for example, minimum score(s), a minimum index, and optionally validity information, and may output an optimal disparity and optionally validity information. The overall match cost C*(P,d) may be the sum of $C_o$(P,d) over all considered orientations. The optimal disparity for each pixel may be the disparity with the minimum C*(P,d) for all disparities, which may be shown as minindex/d C*(P,d).

Figure 8:
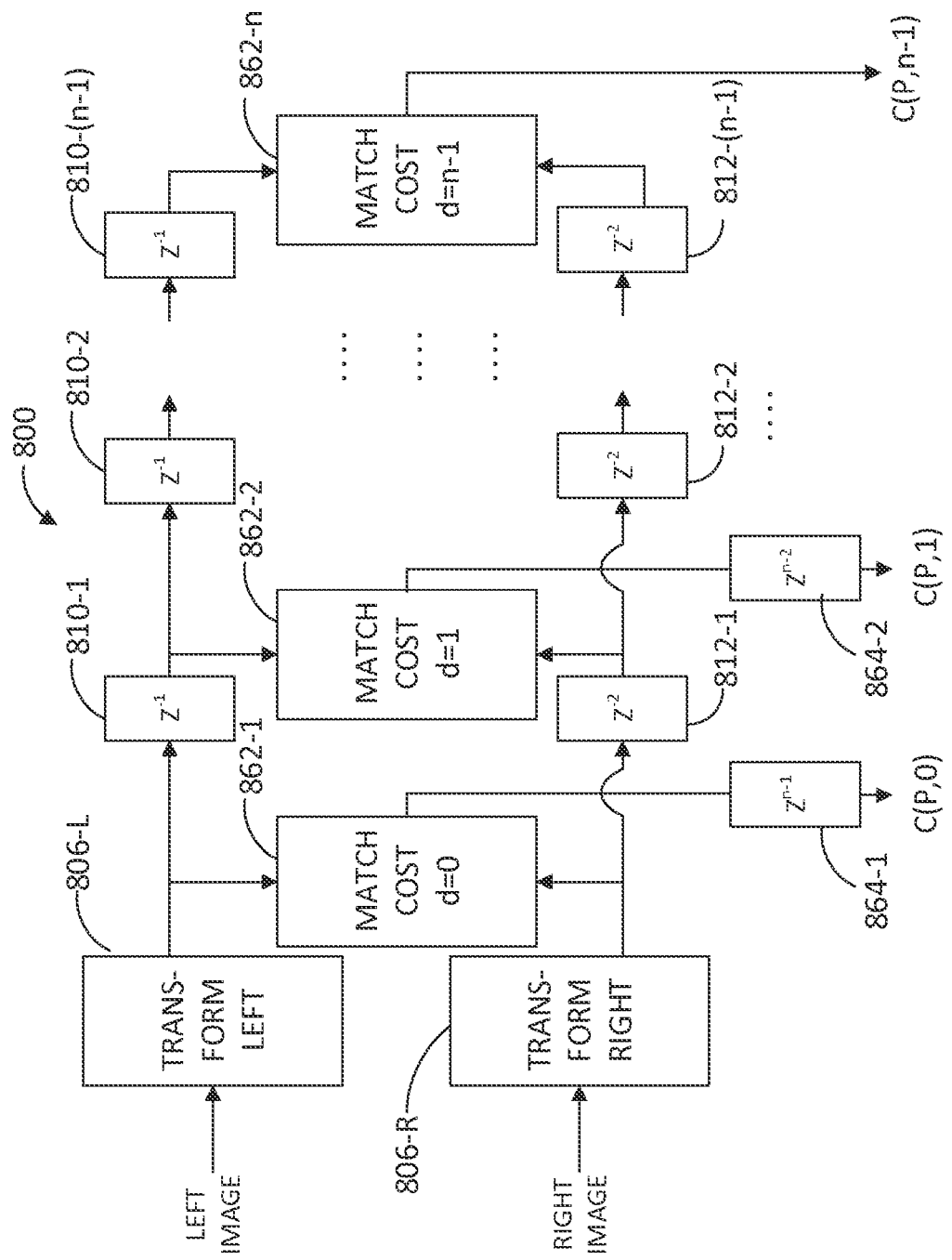
FIG. 8 is a logic diagram of a pipeline. architecture that may be used to compute basic match costs, according to an embodiment.

In an embodiment, the basic match costs C(P,d) (e.g., summed census scores) may be computed in a pipeline having two delays per correlator for the right image, and one for each pixel of the left image, optionally along with texture measures. In this embodiment, no minimum scores are computed. The scores may be appropriately delayed such that the match score for each disparity, as well as a texture result for a single left pixel are all available simultaneously. An exemplary structure for this embodiment may be as shown in structure 800 of FIG. 8, including transform blocks 806-L and 806-R, match cost units 862-1 through 862-n, delays 810-1 through 810-(n-1), delays 812-1 through 812-(n-1), and delays 864-1 through 864-n (not shown).

Figure 9:
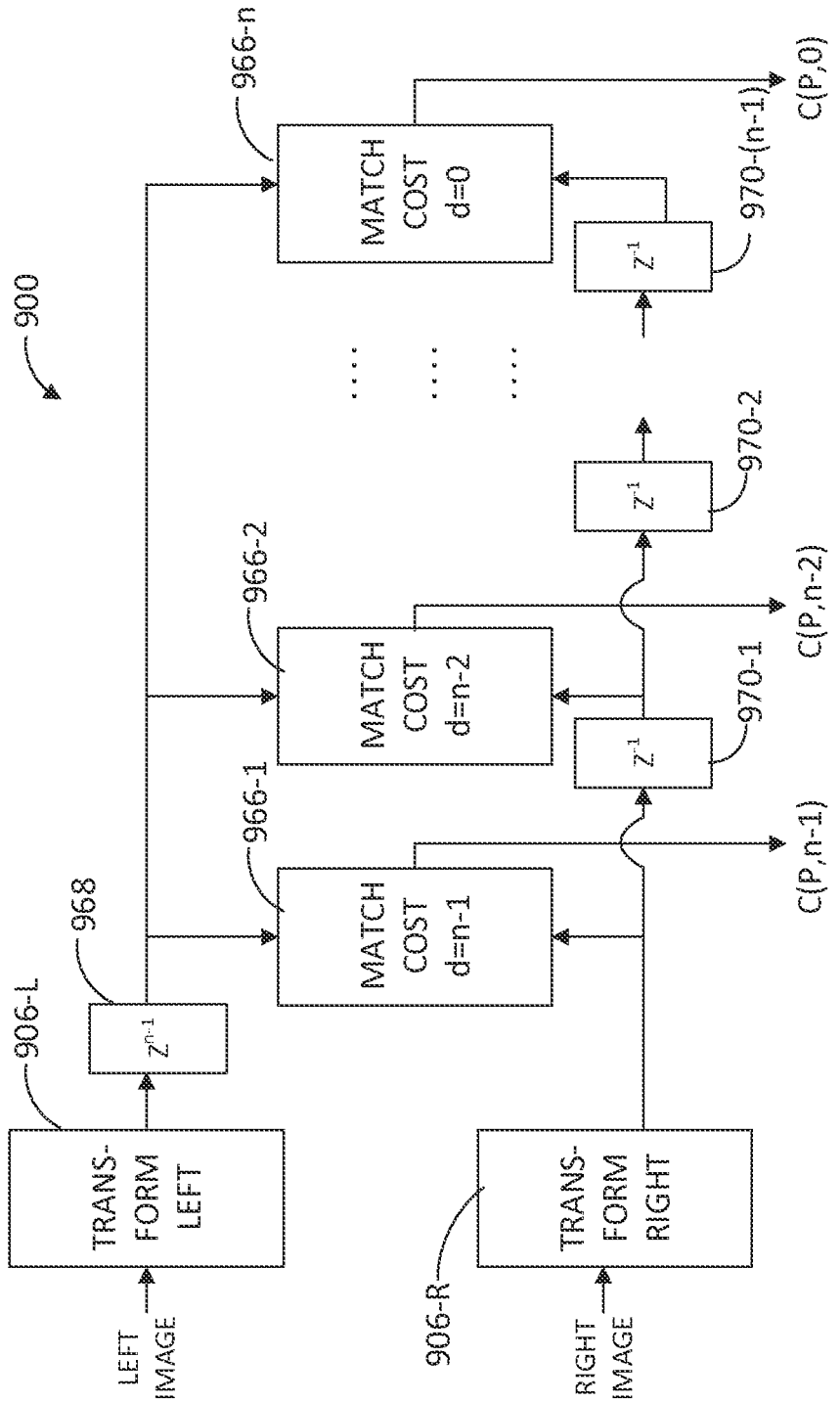
FIG. 9 is a logic diagram of an alternative pipeline architecture that may be used to compute basic match costs, according to an embodiment.

In an alternative embodiment, the basic match costs C(P,d) may be computed in a pipeline that delays the left pixels by the number of disparities, and compares each delayed left pixel with the same number of differently delayed right pixels. Although this embodiment would be harder to route, it would require significantly fewer delay stages. An exemplary structure for this embodiment may be as shown in structure 900 of FIG. 9, including transform blocks 906-L and 906-R, match cost units 966-1 through 966-n, delay 968, and delays 970-1 through 970-(n-1).

Once basic match costs C(P,d) are available, $C_W(P,d)$ for all disparities, as well as min/j $C_W(P,j)$ may be computed in one pixel-clock time. The algorithm for computing $C_W(P,d)$ may be shown as:

$$C_W(P,d) = C(P,d) + \min[C_W(P_W,d), C_W(P_W,d-1)+k1, C_W(P_W,d+1)+k1, \min/j\, C_W(P_W,j)+k2] - \min/k\, C_W(P_W,k) \qquad \text{Eq. 6}$$

Figure 10:
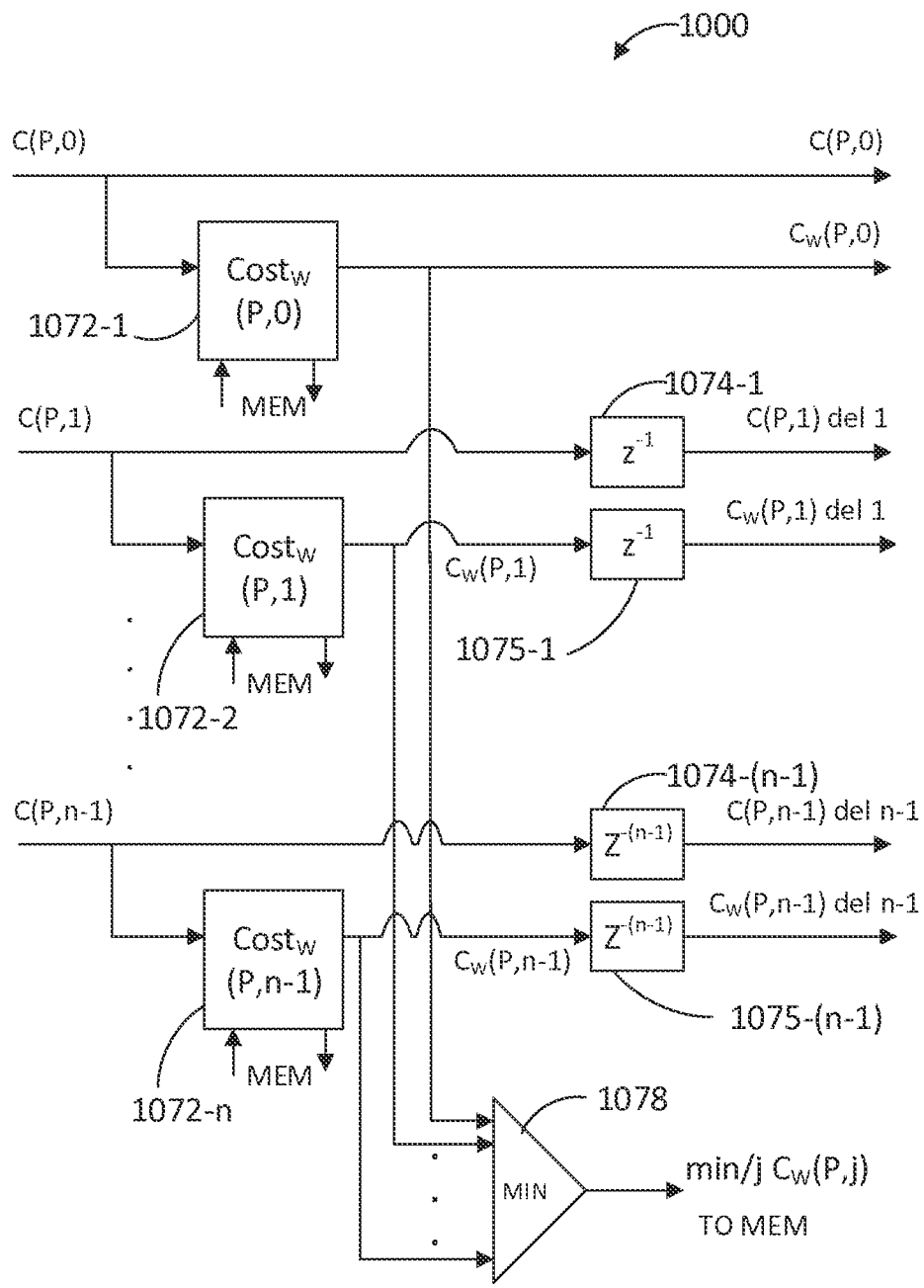
FIG. 10 is a logic diagram of an aggregator that may be used to process pixels from a west orientation, according to an embodiment.
Figure 11:
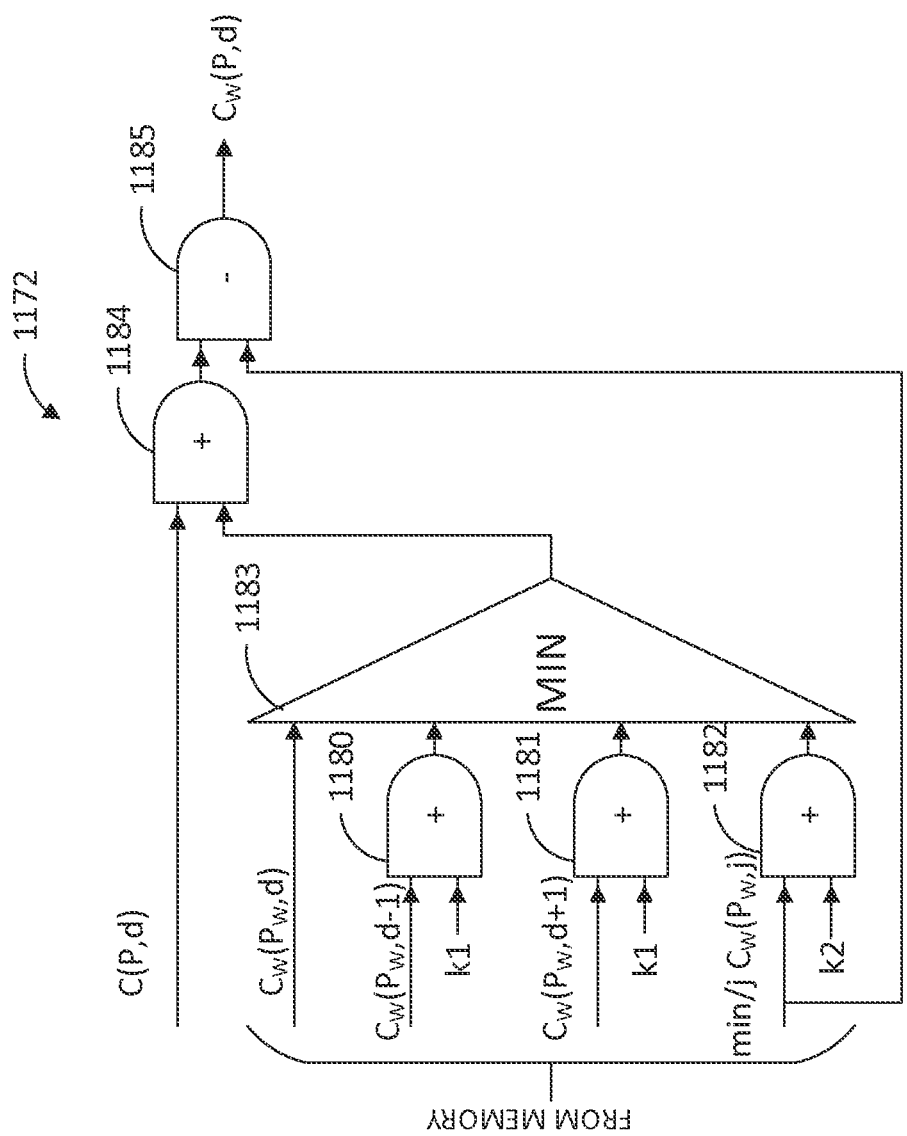
FIG. 11 is a logic diagram of a cost computation unit, such as a cost computation unit from FIG. 10, according to an embodiment.

An implementation of the computation of $C_W(P,d)$ for all d and min/j $C_W(P_W,j)$ may be shown as in module 1000 of FIG. 10, according to an embodiment. In module 1000, costs $C_W(P,d)$ for each disparity may be computed in parallel by cost units 1072-1 through 1072-n based on basic match costs C(P,d) and costs $C_W(P_W,d)$ that may be obtained from memory accesses, initial basic costs C(P,d), $C_W(P,d)$, and optionally texture measures may be appropriately delayed via, for example, delays 1074-1 through 1074-(n-1) and delays 1075-1 through 1075-(n-1) and fed into a second differentially delayed pipeline (discussed below). A min/j $C_W(P,j)$ may be determined via comparator 1078 and stored in memory. An exemplary structure for the above-described algorithm to determine $C_W(P,d)$ (shown above as Eq. 6) may be seen in FIG. 11, which shows a cost unit 1172 (which may represent any of the cost units shown in FIG. 10) including adders 1180, 1181, and 1182, comparator 1183, and adders 1184 and 1185.

Once costs C(P,d) and $C_W(P_W,j)$ are available, their values, and optionally texture measures, may be appropriately delayed and fed into a second differentially delayed pipeline to compute $C_{NW}(P,d)$, $C_N(P,d)$, $C_{NE}(P,d)$, an overall match cost C*(P,d), minimum score(s), and a minimum index, as well as optionally validity information, etc. FIG. 12 is a logic diagram of a correlation pipeline 1200 that may be used to process stereo image pixels for the "North and West" example, according to an embodiment. In an embodiment, pipeline 1200 may include correlator units 1286-1 through 1286-n (one for each disparity) that may receive, in parallel, inputs of C(P,d) and C(P,d) and may compute minimum aggregate scores, a minimum score, a minimum index, and optionally other data, such as, for example, texture measures and other measures that may be used to determine validity of a match. An input into pipeline 1200 may include minimum aggregate scores, which may be provided from a memory. In addition, pipeline 1200 may output minimum aggregate scores to the memory.

Figure 13B:
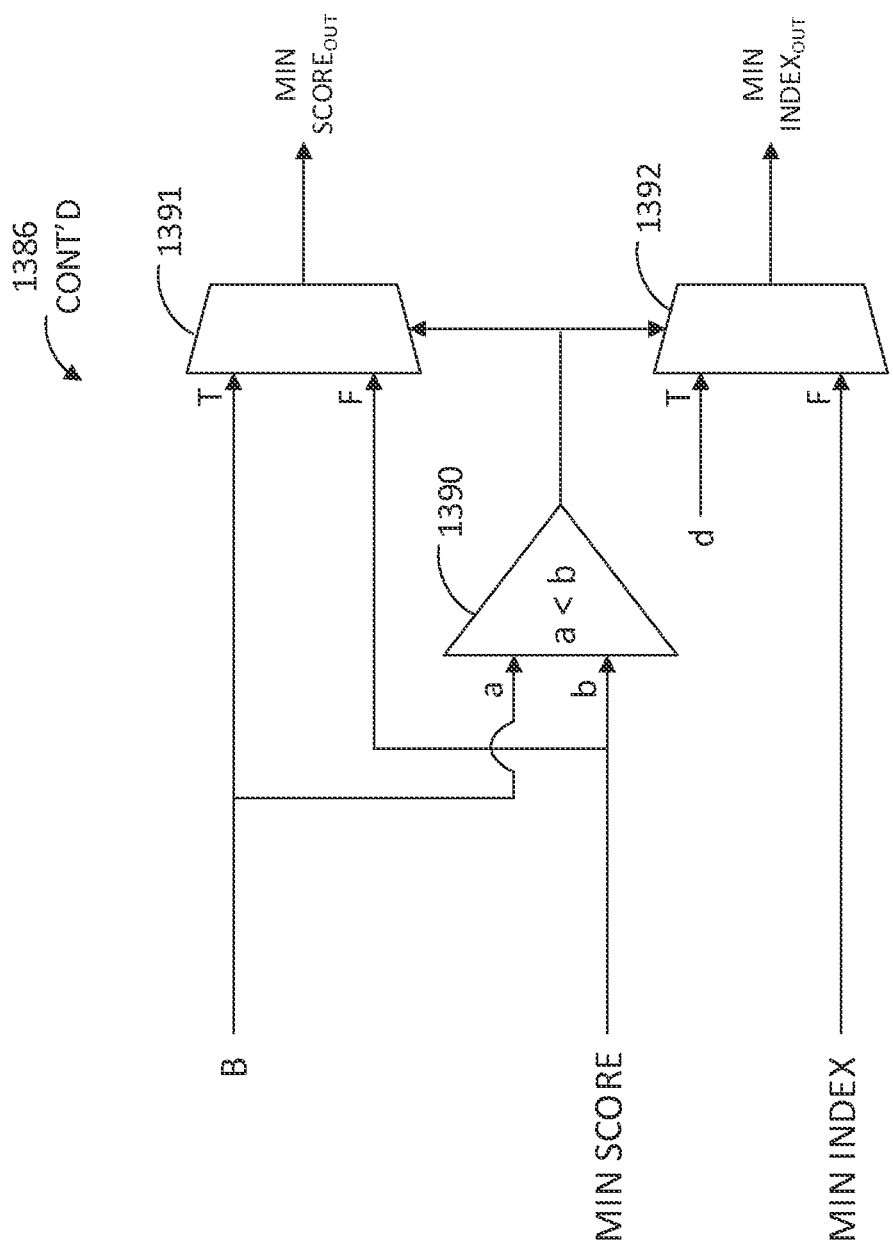

FIGS. 13A and 13B together depict a logic diagram of a correlator 1386, which may represent a correlator from FIG. 12, according to an embodiment. Correlator 1386 may include aggregators 1387$_{NW}$, 1387$_N$, and 1387$_{NE}$, one for each "north" orientation. Each of aggregators 1387 may receive as inputs basic cost C(P,d) and a current minimum score for its respective orientation. Aggregators 1387 may output costs $C_{NW}(P,d)$, $C_N(P,d)$, and $C_{NE}(P,d)$, respectively. Correlator 1386 may also include comparators 1388$_{NW}$, 1388$_N$, and 1388$_{NE}$, that may each receive as inputs the respective cost $C_{NW}(P,d)$, $C_N(P,d)$, or $C_{NE}(P,d)$ computed by respective aggregator 1387, and the current minimum score for its respective orientation. Comparators 1388 may output new minimum scores for their respective orientations to the minimum aggregate scores bus. Correlator 1386 may also include an adder 1389 that may sum the costs $C_{NW}(P,d)$, $C_N(P,d)$, and $C_{NE}(P,d)$ together with cost $C_W(P,d)$. The result of this summing is shown in FIG. 13A as a combined aggregate score "B". As shown in FIG. 13B, combined aggregate score "B" may be compared to a current minimum score at comparator 1390 to determine if combined aggregate score "B" is less than the current minimum score, and the output (0 or 1) may be used as the selector input to each of multiplexors 1391 and 1392. Multiplexor 1391 may output a new minimum score, the minimum of combined aggregate score "B" and the current minimum score. Multiplexor 1392 may output a new minimum index, a minimum of a current disparity d and a current minimum index.

In the above "North and West" example, consideration from the north, northeast, and northwest orientations were all considered in addition to the west orientation. This was done by way of example and ease of discussion only, and not to be limiting. As would be understood by those skilled in the art, any orientation or combination of orientations above pixel P may be considered in addition to the west orientation, including the alternative orientations discussed above.

The "Non-South" Example

In this "Non-South" example (which may also be referred to herein as the "East" example), an east (E) orientation is considered in addition to the NW, N, NE, and W orientations. Cost $C_E(P,d)$ and min/j $C_E(P,j)$ may be computed in one pixel-clock time, but scanning a row of pixels from right to left (from an east (E) orientation). In this example, before starting the right to left scan, a whole row of match costs C(P,d) for each disparity and a whole row of $C_W(P,d)$ for each disparity may be stored. In an embodiment, costs $C_{NW}(P,d)$, $C_N(P,d)$, and $C_{NE}(P,d)$ may be computed and added to the cost $C_W(P,d)$, with the resulting sum stored. In an alternative embodiment, costs $C_{NW}(P,d)$, $C_N(P,d)$, and $C_{NE}(P,d)$ may be computed in a final disparity computation as in the "North and West" example (as discussed above with reference to FIGS. 13A and 13B). In the "Non-South" example, the computation of C(P,d) and $C_W(P,d)$ may be the same as in the "North and West" example. Once C(P,d) and $C_W(P,d)$ are stored, the final computations of $C_E(P,d)$ and disparity may be similar to the computations of $C_W(P,d)$ and disparity in the "North and West" example. However, the scan goes from right to left, and the correlators have an additional input, namely $C_E(P,d)$, as shown in FIG. 14, where NWE correlators 1486 of correlator pipeline 1400 each have an additional input of $C_E(P,d)$, and also as shown in FIG. 15, where adder 1589 of partially-shown correlator unit 1586 has an additional input of $C_E(P,d)$.

In an embodiment, storage for C(P,d) and $C_W(P,d)$ may be filled from left-to-right and right-to-left for alternate scanline rows with reference to successive pixel locations in the stereo image, which may allow C(P,d) and $C_W(P,d)$ to be appropriately available, as $C_E(P,d)$ is computed from right to left. This may allow the same storage to be used for both the row on which C(P,d) and $C_W(P,d)$ may be computed, as well as for the row in which $C_E(P,d)$ may be computed. An example of this is shown in FIG. 16, which depicts successive storage and reading out of scanline data in alternating directions using the same single row of storage, according to an embodiment. In example 1651, scanline data from row 0 may be inserted into a storage line from left to right. When storage of row 0 data is complete, storage of row 1 data may begin to be inserted from right to left as row 0 data is being read out from right to left, as shown in example 1653. Example 1655 shows the progression of the storage of row 1 data from right to left as row 0 data is being read out from right to left. When storage of row 1 data is complete, storage of row 2 data may begin to be inserted from left to right as row 1 data is being read out from left to right, as shown in example 1657. Example 1659 shows the progression of the storage of row 2 data from left to right as row 1 data is being read out from left to right. Those of skill in the art would recognize that this would continue for the storage and data readouts of the remaining scanline data of the stereo image as needed.

The "Non-South" (or "East") example may similarly be depicted as shown in block diagram 1700 of FIG. 17, where data from left and right images of a stereo image may be input to a basic cost logic unit 1702, which may output basic match costs C(P,d) and optionally texture information to a west cost logic unit 1760. West cost logic unit 1760 may output C(P,d). $C_W(P,d)$, and optionally texture information to an east cost logic unit 1793, which may output C(P,d), $C_W(P,d)$, and $C_E(P,d)$, and optionally texture information to a north cost logic unit 1704. In this example, the east cost logic unit 1793 may reverse its inputs row by row. North cost logic unit 1704 may compute $C_{NW}(P,d)$, $C_N(P,d)$, $C_{NE}(P,d)$, and output C(P,d), $C_W(P,d)$, $C_E(P,d)$, $C_{NW}(P,d)$, $C_N(P,d)$, $C_{NE}(P,d)$, and optionally texture information to a disparity logic unit 1794, which may determine an overall match cost C*(P,d), along with, for example, minimum score(s), a minimum index, and optionally validity information, and may output an optimal disparity and optionally validity information. The overall match cost C*(P,d) may be the sum of $C_o(P,d)$ over all considered orientations. The optimal disparity for each pixel may be the disparity with the minimum C*(P,d) for all disparities, which may he shown as: minindex/d C*(P,d). In an embodiment, disparity logic unit 1794 may include an overall match logic unit 1795 to determine the overall match cost C*(P,d), and may include a resulting disparity logic unit 1796 to determine the optimal disparity. As with other block diagrams described herein, the system may be broken down into functional blocks for ease of understanding, but is not to be limited to the breakdowns shown. For example, the functions of the disparity logic unit 1794 may alternatively be configured as part of the north cost logic unit 1704.

The "Non-South" (or "East") example may also be depicted as shown in block diagram 1800 of FIG. 18, where data from left and right images of a stereo image may be input to a cost logic unit 1897, which may output C(P,d), $C_W(P,d)$, $C_E(P,d)$, $C_{NW}(P,d)$, $C_N(P,d)$, $C_{NE}(P,d)$, and optionally texture information to a disparity logic unit 1894. Disparity logic unit 1894 may determine an overall match cost C*(P,d), along with, for example, minimum score(s), a minimum index, and optionally validity information, and may output an optimal disparity and optionally validity, which may optionally be stored. As previously discussed, the overall match cost C*(P,d) may be the sum of C(P,d) over all considered orientations, and the optimal disparity for each pixel may be the disparity with the minimum C*(P,d) for all disparities, which may be shown as: minindex/d C*(P,d). Disparity logic unit 1894 may include an overall match logic unit 1895 to determine the overall match cost C*(P,d), and may include a resulting disparity logic unit 1896 to determine the optimal disparity. As with other block diagrams described herein, the system may be broken down into functional blocks for ease of understanding, but is not to be limited to the breakdowns shown. For example, the functions of the disparity logic unit 1894 may alternatively be configured as part of the cost logic unit 1897.

The method discussed above for the "East" example may be summarized as shown in the flow chart 1900 of FIG. 19, according to an embodiment. At 1902, a basic match costs C(P,d) at each pixel P between a pair of stereo images may be determined for a given set of disparities d. At 1904, a match cost $C_{EAST}(P,d)$ for each pixel may be determined based on determined basic match costs C(P,d). At 1906, one or more additional match costs for each pixel for one or more other orientations may be determined based on the determined match costs C(P,d). At 1908, an overall match cost for each pixel at each of disparities d may be determined based on a sum of the determined match costs for all considered orientations for each pixel and disparity pair, At 1910, a resulting; disparity for each pixel may be determined based on a minimum of the determined overall match costs.

Another summarization of the method discussed above for the "East" example may be shown in flow chart 2000 of FIG. 20. At 2002, for each pixel between a pair of stereo images, and for each considered disparity, a match cost may be determined for each of a set of given orientations of pixel processing, where the set of given orientations includes an east orientation and one or more other orientations. The match cost for the given orientations may incorporate data associated with a pixel located at that orientations from a perspective of pixel P. At 2004, an overall match cost may be determined for each pixel at each considered disparity based on a sum of determined match costs for all of the orientations for each pixel and disparity pair. At 2006, a resulting disparity for each pixel may be determined based on a minimum of the determined overall match costs.

The respective tasks shown in the examples of FIGS. 19 and 20 may be performed in an overlapping or parallel manner as the image data from the input images is being read in such that a subset of the determined resulting disparities becomes available prior to completion of the input images being read in. This is due, in part, to basing match cost determinations on previously stored match cost determinations for previously read pixels in an optimized way, and in doing so, a latency of disparity determination over prior known systems is significantly reduced. In an embodiment, a latency associated with the determination of the match costs and resulting disparities is proportional to an amount of time it takes to read in a single scanline of image data of the input images. In addition, in an embodiment, the resulting disparities for all pixels of the stereo images may be determined in a single pass through the input images.

In the above "Non-South" example, consideration from the west, north, northeast, and northwest orientations were all considered in addition to the east orientation. This was done by way of example and ease of discussion only, and not to be limiting. As would be understood by those skilled in the art, any orientation or combination of orientations level or above pixel P may be considered in addition to the east orientation, including the alternative orientations discussed above.

Presented above are systems and methods for computing a disparity map that approximate more optimal systems and methods, but are amenable to efficient implementation in hardware, An advantage of the approaches described herein is that each scanline of pixels is processed only once from left to right, and once from right to left, in a single pass, where memory storage is proportional to the size of the scanline multiplied by the number of possible disparity values, time is proportional to the size of the scanline, and hardware computational resources are proportional to the number of disparities. In addition, initial disparity results can be read out before all of the input pixels have entered the system, resulting in the latency of the system being limited to a small number of scanlines of input data, Further, the disparity computed at each pixel benefits from the knowledge of the disparities computed on previous scanlines and other pixels on the current scanline.

Exemplary Systems

FIG. 21 is a block diagram of an exemplary system 2100 in which the methods described herein may be implemented, according to an embodiment. System 2100 may include a. computing device 2101 having an image processor 2103 with one or more logic units 2105. System 2100 may also include cameras 2107/2109 with sensors 2111/2113, respectively. In an embodiment, cameras 2107/2109 may be integrated with computing device 2101. In another embodiment, cameras 2107/2109 may not he a part of computing device 2101. In such an embodiment, image data captured by cameras 2107/2109 at sensors 2111/2113 may be provided to computing device 2101 for processing at image processor 2103 via input/output (I/O) ports (not shown) at the cameras 2107/2109 and computing device 2101. The communication between the I/O ports may he, for example, wireless communication, wired communication, or via a hand-carried computer-readable medium such as a compact disk, a flash drive, or other data storage device. In an embodiment, image processor 2103 may execute the methods described herein using one or more logic units 2105. One skilled in the art would recognize that the functions described herein may be executed by a single logic unit, or any number of logic units.

One or more features disclosed herein may be implemented in hardware, software, firmware, and combinations thereof including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory, computer readable medium may be a compact disk, a flash memory, or other data storage device.

In an embodiment, some or all of the processing described herein may be implemented as software or firmware, Such a software or firmware embodiment may be illustrated in the context of a computing system 2201 in FIG. 22. Computing system 2201 may represent, for example, computing device 2101 shown in FIG. 21. Computing system 2201 may include one or more central processing unit(s) (CPU), such as general processor 2215, connected to memory 2217, one or more secondary storage devices 2219, and an image processor 2203 by a bus 2221 or similar mechanism. Alternatively, image processor 2203 may be integrated with general processor 2215. Image processor 2203 may include one or more logic units 2205 for carrying out the methods described herein. One skilled in the art would recognize that the functions described herein may be executed by a single logic unit, or any number of logic units. Computing system 2201 may optionally include communication interface(s) 2223 and/or user interface components 2225. The one or more secondary storage devices 2219 may be, for example, one or more hard drives or the like, and may store instructions 2227 to be executed by image processor 2203 and/or general processor 2215. In an embodiment, the general processor 2215 and/or image processor 2203 may be microprocessors, and software, such as instructions 2227, may be stored or loaded into the memory 2217 for execution by general processor 2215 and/or image processor 2203 to provide the functions described herein. As discussed above, in an embodiment, computing system 2201 may include integrated cameras 2207/2209 having sensors 2211/2213, respectively. In another embodiment, cameras 2207/2209 may not be integrated with computing system 2201. In such an embodiment, communication interface(s) 2223 may be used to provide image data captured by cameras 2207/2209 to computing system 2201 for processing using methods described herein. Note that while not shown, computing system 2201 may include additional components.

The systems, methods, and computer program products described above may be a part of a larger information system. FIG. 23 illustrates such an embodiment, as a system 2300. In embodiments, system 2300 may be a media system although system 2300 is not limited to this context. For example, system 2300 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile Internet device (MID), messaging device, data communication device, and so forth.

In embodiments, system 2300 comprises a platform 2302 coupled to a display 2320. Platform 2302 may receive content from a content device such as content services device(s) 2330 or content delivery device(s) 2340 or other similar content sources. A navigation controller 2350 comprising one or more navigation features may be used to interact with, for example, platform 2302 and/or display 2320. Each of these components is described in more detail below.

In embodiments, platform 2302 may comprise any combination of a chipset 2305, processor 2310, memory 2312, storage 2314, graphics subsystem 2315, applications 2316 and/or radio 2318. Chipset 2305 may provide intercommunication among processor 2310, memory 2312, storage 2314, graphics subsystem 2315, applications 2316 and/or radio 2318. For example, chipset 2305 may include a storage adapter (not depicted) capable of providing intercommunication with storage 2314.

Processor 2310 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 2310 may comprise dual-core processor(s), dual-core mobile processor(s), and so forth.

Memory 2312 may be implemented as a volatile memory device such as, but not limited to, a Random Access Memory (RAM), Dynamic Random Access Memory (DRAM), or Static RAM (SRAM).

Storage 2314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 2314 may comprise technology to increase the storage performance enhanced protection for valuable digital media when multiple hard drives are included, for example.

Graphics subsystem 2315 may perform processing of images such as still or video for display. Graphics subsystem 2315 may be a graphics processing unit (GPU) or a visual processing unit (WU), for example. An analog or digital interface may be used to communicatively couple graphics subsystem 2315 and display 2320. For example, the interface may be any of a High-Definition Multimedia Interface, DisplayPort, wireless HDMI, and/or wireless HD compliant techniques. Graphics subsystem 2315 could be integrated into processor 2310 or chipset 2305. Graphics subsystem 2215 could be a stand-alone card communicatively coupled to chipset 2305.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 2318 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area networks (WMANs), cellular networks, and satellite networks. In communicating across such networks, radio 2318 may operate in accordance with one or more applicable standards in any version.

In embodiments, display 2320 may comprise any television type monitor or display. Display 2320 may comprise, for example, a computer display screen, touch screen display, video monitor, television-like device, and/or a television. Display 2320 may be digital and/or analog. In embodiments, display 2320 may be a holographic display. Also, display 2320 may be a transparent surface that may receive a visual projection. Such projections may convey various forms of information, images, and/or objects. For example, such projections may be a visual overlay for a mobile augmented reality (MAR) application. Under the control of one or more software applications 2316, platform 2302 may display user interface 2322 on display 2320.

In embodiments, content services device(s) 2330 may be hosted by any national, international and/or independent service and thus accessible to platform 2302 via the Internet, for example. Content services device(s) 2330 may be coupled to platform 2302 and/or to display 2320. Platform 2302 and/or content services device(s) 2330 may be coupled to a network 2360 to communicate (e.g., send and/or receive) media information to and from network 2360. Content delivery device(s) 2340 also may be coupled to platform 2302 and/or to display 2320.

In embodiments, content services device(s) 2330 may comprise a cable television box, personal computer, network, telephone, Internet enabled devices or appliance capable of delivering digital information and/or content, and any other similar device capable of unidirectionally or bidirectionally communicating content between content providers and platform 2302 and/display 2320, via network 2360 or directly. It will be appreciated that the content may be communicated unidirectionally and/or bidirectionally to and from any one of the components in system 2300 and a content provider via network 2360. Examples of content may include any media information including, for example, video, music, medical and gaming information, and so forth.

Content services device(s) 2330 receives content such as cable television programming including media information, digital information, and/or other content. Examples of content providers may include any cable or satellite television or radio or Internet content providers. The provided examples are not meant to limit embodiments disclosed herein.

In embodiments, platform 2302 may receive control signals from navigation controller 2350 having one or more navigation features. The navigation features of controller 2350 may be used to interact with user interface 2322, for example. In embodiments, navigation controller 2350 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2350 may be echoed on a display (e.g., display 2320) by movements of a pointer, cursor, focus ring, or other visual indicators displayed on the display. For example, under the control of software applications 2316, the navigation features located on navigation controller 2350 may be mapped to virtual navigation features displayed on user interface 2322, for example. In embodiments, controller 2350 may not be a separate component but integrated into platform 2302 and/or display 2320. Embodiments, however, are not limited to the elements or in the context shown or described herein, In embodiments, drivers (not shown) may comprise technology to enable users to instantly turn on and off platform 2302 like a television with the touch of a button after initial boot-up, when enabled, for example. Program logic may allow platform 2302 to stream content to media adaptors or other content services device(s) 2330 or content delivery device(s) 2340 when the platform is turned "off" In addition, chipset 2305 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 2300 may be integrated. For example, platform 2302 and content services device(s) 2330 may be integrated, or platform 2302 and content delivery device(s) 2340 may be integrated, or platform 2302, content services device(s) 2330, and content delivery device(s) 2340 may be integrated, for example, in various embodiments, platform 2302 and display 2320 may be an integrated unit. Display 2320 and content service device(s) 2330 may be integrated, or display 2320 and content delivery device(s) 2340 may be integrated, for pie. These examples are not meant to limit the embodiments disclosed herein.

In various embodiments, system 2300 may be implemented as a wireless system, a wired system, or a combination of both. When implemented as a wireless system, system 2300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 2302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 23.

As described above, system 2300 may be embodied in varying physical styles or form factors. FIG. 24 illustrates embodiments of a small form factor device 2400 in which system 2300 may be embodied. In embodiments, for example, device 2400 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 24, device 2400 may comprise a housing 2402, a display 2404, an input/output (I/O) device 2406, and an antenna 2408. Device 2400 also may comprise navigation features 2412. Display 2404 may comprise any suitable display unit for displaying information appropriate for a mobile computing device. I/O device 2406 may comprise any suitable I/O device for entering information into a mobile computing device. Examples for I/O device 2406 may include an alphanumeric keyboard, a numeric keypad, a touch pad, input keys, buttons, switches, rocker switches, microphones, speakers, voice recognition devices and software, and so forth. Information also may be entered into device 2400 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

The following examples pertain to further embodiments.

Example 1 may include a system for use in image processing, comprising an image processor comprising a basic match cost logic unit configured to determine, for a given set of disparities d, a basic match cost C(P,d) at each pixel P between a pair of stereo images input for processing; an east orientation cost logic unit configured to determine a match cost $C_{East}(P,d)$ for each pixel P based on corresponding determined basic match costs COW), wherein match cost $C_{East}(P,d)$ incorporates data associated with a pixel located to the east of pixel P; and one or more additional orientation cost logic units configured to determine one or more additional match costs for each pixel P, the one or more additional match costs incorporating data associated with pixels at one or more other directional orientations from a perspective of pixel P. The system may also include a disparity logic unit configured to determine an overall match cost for each pixel P at each of disparities d based on a sum of the determined match costs for all considered orientations for each pixel and disparity pair and determine a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images. The system may also include a memory, in communication with the image processor, that is used to store necessary data in the determination of the match costs and resulting disparities.

Example 2 may include the subject matter of example 1, wherein the one or more additional orientation cost logic units include a west orientation cost logic unit configured to determine a match cost $C_{West}(P,d)$ for each pixel P based on corresponding determined basic match costs C(P,d), wherein match cost $C_{West}(P,d)$ incorporates data associated with a pixel located to the west of pixel P; and wherein, prior to starting the determination of match costs $C_{East}(P,d)$, the determined basic match costs C(P,d) and match costs $C_{West}(P,d)$ at each disparity for a scanline row of pixels are stored such that basic match costs C(P,d) and match costs $C_{West}$(P,d) are made available as necessary to determine $C_{East}$(P,d) in right to left order.

Example 3 may include the subject matter of example 2, wherein the determined basic match costs C(P,d) and match costs $C_{West}$(P,d) are stored from left-to-right and right-to-left for alternate scanline rows with reference to pixel locations of the input images such that the same storage can be used for both the row in which C(P,d) and $C_{West}$(P,d) are computed and for the row in which $C_{East}$(P,d) is computed.

Example 4 may include the subject matter of any of examples 1-3, wherein a minimum storage capacity of the memory for the determination of match costs is proportional to a value representing the number of pixels of a single scanline of pixels of the input images multiplied by a value representing the number of considered disparities.

Example 5 may include the subject matter of any of examples 1-4, wherein a latency associated with the determination of the match costs and resulting disparities is proportional to an amount of time it takes to read in a single scanline of image data of the input images.

Example 6 may include the subject matter of any of examples 1, 4, and 5, wherein the one or more additional orientation cost logic units include one or more of a west orientation cost logic unit configured to determine a match cost $C_{West}$(P,d) for each pixel P based on corresponding determined basic match costs C(P,d), wherein match cost $C_{West}$(P,d) incorporates data associated with a pixel located to the west of pixel P; and one or more north orientation cost logic units configured to determine one or more northern-orientated match costs for each pixel P based on corresponding determined basic match costs C(P,d), wherein the one or More northern-orientated match costs include one or more of $C_{North}$(P,d) that incorporates data associated with a pixel located to the north of pixel P, $C_{Northwest}$(P,d) that incorporates data associated with a pixel located to the northwest of pixel P, and $C_{Northeast}$(P,d) that incorporates data associated with a pixel located to the northeast of pixel P.

Example 7 may include the subject matter of any of examples 1 and 4-6, wherein the one or more additional orientation cost logic units include one or more alternative orientation cost logic units configured to determine one or more alternative-orientated match costs for each pixel P based on corresponding determined basic match costs C(P,d), wherein the alternative-orientated match costs incorporate data associated with pixels other than pixels located east, west, north, northwest, northeast, and anywhere south of pixel P.

Example 8 may include a computer program product for image processing, including at least one non-transitory computer readable medium having computer program logic stored therein, the computer program logic including: logic to cause a processor to determine, for a given set of disparities d, a basic match cost C(P,d) at each pixel P between a pair of stereo images input for processing; logic to cause the processor to determine a match cost $C_{East}$(P,d) for each pixel P based on corresponding determined basic match costs C(P,d), wherein match cost $C_{East}$(P,d) incorporates data associated with a pixel located to the east of pixel P; logic to cause the processor to determine one or more additional match costs for each pixel P, the one or more additional match costs incorporating data associated with pixels at one or more other directional orientations from a perspective of pixel P; logic to cause the processor to determine an overall match cost for each pixel P at each of disparities d based on a sum of the determined match costs for all considered orientations for each pixel and disparity pair; and logic to cause the processor to determine a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images.

Example 9 may include the subject matter of example 8, wherein the logic to cause the processor to determine one or more additional match costs comprises logic to cause the processor to determine a match cost $C_{West}$(P,d) for each pixel P based on corresponding determined basic match costs C(P,d), wherein match cost $C_{West}$(P,d) incorporates data associated with a pixel located to the west of pixel P, and wherein the computer program logic further comprises logic to cause the processor to store, prior to starting the determination of match costs $C_{East}$(P,d), the determined basic match costs C(P,d) and match costs $C_{West}$(P,d) at each disparity for a scanline row of pixels such that basic match costs C(P,d) and match costs $C_{West}$(P,d) are made available as necessary to determine $C_{East}$(P,d) in right to left order.

Example 10 may include the subject matter of example 9, wherein the computer program logic further comprises logic to cause the processor to store the determined basic match costs C(P,d) and match costs $C_{West}$(P,d) from left-to-right and right-to-left for alternate scanline rows with reference to pixel locations of the input images such that the same storage can be used for both the row in which C(P,d) and $C_{West}$(P,d) are computed and for the row in which $C_{East}$(P,d) is computed.

Example 11 may include the subject matter of any of examples 8-10, wherein a minimum storage capacity for the determination of match costs is proportional to a value representing the number of pixels of a single scanline of pixels of the input images multiplied by a value representing the number of considered disparities.

Example 12 may include the subject matter of any of examples 8-11, wherein a latency associated with the determination of the match costs and resulting disparities is proportional to an amount of time it takes to read in a single scanline of image data of the input images.

Example 13 may include the subject matter of any of examples 8, 11, and 12, wherein the computer program logic further comprises one or more of: logic to cause the processor to determine a match cost $C_{West}$(P,d) for each pixel P based on corresponding determined basic match costs C(P,d), wherein match cost $C_{West}$(P,d) incorporates data associated with a pixel located to the west of pixel P; and logic to cause the processor to determine one or more northern-orientated match costs for each pixel P based on corresponding determined basic match costs C(P,d), wherein the one or more northern-orientated match costs include one or more of $C_{North}$(P,d) that incorporates data associated with a pixel located to the north of pixel P, $C_{Northwest}$(P,d) that incorporates data associated with a pixel located to the northwest of pixel P, and $C_{Northeast}$(P,d) that incorporates data associated with a pixel located to the northeast of pixel P.

Example 14 may include the subject matter of any of examples 8 and 11-13, wherein the computer program logic further comprises logic to cause the processor to determine one or more alternative-orientated match costs for each pixel P based on corresponding determined basic match costs C(P,d), wherein the alternative-orientated match costs incorporate data associated with pixels other than pixels located east, west, north, northwest, northeast, and anywhere south of pixel P.

Example 15 may include an apparatus for image processing, comprising means for determining, for a given set of disparities d, a basic match cost C(P,d) at each pixel P between a pair of stereo images input for processing; means for determining a match cost $C_{East}$(P,d) for each pixel P based on corresponding determined basic match costs C(P,d), wherein match cost $C_{East}$(P,d) incorporates data associated with a pixel located to the east of pixel P; means for determining one or more additional match costs for each pixel P, the one or more additional match costs incorporating data associated with pixels at one or more other directional orientations from a perspective of pixel P; means for determining an overall match cost for each pixel P at each of disparities d based on a such of the determined match costs for all considered orientations for each pixel and disparity pair; and means for determining a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images, Example 16 may include the subject matter of example 15, wherein the means for determining one or more additional match costs includes means for determining a match cost $C_{West}$(P,d) for each pixel P based on corresponding determined basic match costs C(P,d), wherein match cost $C_{West}$(P,d) incorporates data associated with a pixel located to the west of pixel P, and wherein the apparatus further comprises means for storing, prior to starting the determination of match costs $C_{East}$(P,d), the determined basic match costs C(P,d) and match costs $C_{West}$(P,d) at each disparity for a scanline row of pixels such that basic match costs C(P,d) and match costs $C_{West}$(P,d) are made available as necessary to determine $C_{East}$(P,d) in right to left order.

Example 17 may include the subject matter of example 16, wherein the determined basic match costs C(P,d) and match costs $C_{West}$(P,d) are stored from left-to-right and right-to-left for alternate scanline rows with reference to pixel locations of the input images such that the same storage can be used for both the row in which C(P,d) and $C_{West}$(P,d) are computed and for the row in which $C_{East}$(P,d) is computed.

In example 18, the subject matter of any of examples 15-17 may optionally include means for storing necessary data in the determination of the match costs, wherein a minimum storage capacity for the determination of match costs is proportional to a value representing the number of pixels of a single scanline of pixels of the input images multiplied by a value representing the number of considered disparities.

Example 19 may include the subject matter of any of examples 15-18, wherein a latency associated with the determination of the match costs and resulting disparities is proportional to an amount of time it takes to read in a single scanline of image data of the input images.

Example 20 may include the subject matter of any of examples 15, 18, and 19, wherein the means for determining one or more additional match costs includes one or more of means for determining a match cost $C_{West}$(P,d) for each pixel P based on corresponding determined basic match costs C(P,d), wherein match cost $C_{West}$(P,d) incorporates data associated with a pixel located to the west of pixel P; and means for determining one or more northern-orientated match costs for each pixel P based on corresponding determined basic match costs C(P,d), wherein the one or more northern-orientated match costs include one or more of $C_{North}$(P,d) that incorporates data associated with a pixel located to the north of pixel P, $C_{Northwest}$(P,d) that incorporates data associated with a pixel located to the northwest of pixel P, and $C_{Northeast}$(P,d) that incorporates data associated with a pixel located to the northeast of pixel P.

Example 21 may include the subject matter of any of examples 15 and 18-20, wherein the means for determining one or more additional match costs includes means for determining one or more alternative-orientated match costs for each pixel P based on corresponding determined basic match costs C(P,d), wherein the alternative-orientated match costs incorporate data associated with pixels other than pixels located east, west, north, northwest, northeast, and anywhere south of pixel P.

Example 22 may include a method of image processing, comprising determining, by a computing device, for a given set of disparities d, a basic match cost C(P,d) at each pixel P between a pair of stereo images input for processing; determining, by the computing device, a match cost $C_{East}$(P,d) far each pixel P based on corresponding determined basic match costs C(P,d), wherein match cost $C_{East}$(P,d) incorporates data associated with a pixel located to the east of pixel P; determining, by the computing device, one or more additional match costs for each pixel P, the one or more additional match costs incorporating data associated with pixels at one or more other directional orientations from a perspective of pixel P: determining, by the computing device, an overall match cost for each pixel P at each of disparities d based on a sum of the determined match costs for all considered orientations for each pixel and disparity pair; and determining, by the computing device, a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images.

Example 23 may include the subject matter of example 22, wherein determining one or more additional match costs includes determining a match cost $C_{West}$(P,d) for each pixel P based on corresponding determined basic match costs C(P,d), wherein match cost $C_{West}$(P,d) incorporates data associated with a pixel located to the west of pixel P, and wherein the method further comprises, prior to starting the determination of match costs $C_{East}$(P,d), storing determined basic match costs C(P,d) and match costs $C_{West}$(P,d) at each disparity for a scanline row of pixels such that basic match costs C(P,d) and match costs $C_{West}$(P,d) are made available as necessary to determine $C_{East}$(P,d) in right to left order.

Example 24 may include the subject matter of example 23, wherein the determined basic match costs C(P,d) and match costs $C_{West}$(P,d) are stored from left-to-right and right-to-left for alternate scanline rows with reference to pixel locations of the input images such that the same storage can be used for both the row in which C(P,d) and $C_{West}$(P,d) is computed and for the row in which $C_{East}$(P,d) is computed.

Example 25 may include the subject matter of any of examples 22-24, wherein a minimum storage capacity for the determination of match costs is proportional to a value representing the number of pixels of a single scanline of pixels of the input images multiplied by a value representing the number of considered disparities.

Example 26 may include the subject matter of any of examples 22-25, wherein a latency associated with the determination of the match costs and resulting disparities is proportional to an amount of time it takes to read in a single scanline of image data of the input images.

Example 27 may include the subject matter of any of examples 22, 25, and 26, wherein determining one or more additional match costs includes determining one or more of determining a match cost $C_{West}(P,d)$ for each pixel P based on corresponding determined basic match costs $C(P,d)$, wherein match cost $C_{West}(P,d)$ incorporates data associated with a pixel located to the west of pixel P; and determining one or more northern-orientated match costs for each pixel P based on corresponding determined basic match costs $C(P,d)$, wherein the one or more northern-orientated match costs include one or more of $C_{North}(P,d)$ that incorporates data associated with a pixel located to the north of pixel P, $C_{Northwest}(P,d)$ that incorporates data associated with a pixel located to the northwest of pixel P, and $C_{Northeast}(P,d)$ that incorporates data associated with a pixel located to the northeast of pixel P.

Example 28 may include the subject matter of any of examples 22 and 25-27, wherein determining one or more additional match costs includes determining one or more alternative-orientated match costs for each pixel P based on corresponding determined basic match costs $C(P,d)$, wherein the alternative-orientated match costs incorporate data associated with pixels other than pixels located east, west, north, northwest, northeast, and anywhere south of pixel P.

Example 29 may include the subject matter of any of examples 22-28, wherein the determining of match costs for each orientation are based on the equation:

$$C_o(P,d)=C(P,d)+\min[C_o(P_o,d),C_o(P_o,d-1)+k1, C_o(P_o,d+1)+k1, \min/x\, C_o(P_o,x)+k2]-\min/y\, C_o(P_o,y)$$

where
$C_o$ represents the match cost at an orientation o,
C represents a basic match cost,
$P_o$ represents a pixel in orientation o from pixel P,
d represents the considered disparity,
k1 and k2 represent defined penalty costs; and
x and y each represent a range of considered disparities.

Example 30 may include the subject matter of any of examples 22-29, wherein the determining basic match costs $C(P,d)$ comprises determining basic match costs $C(P,d)$ for a pixel at each disparity simultaneously.

Example 31 may include the subject matter of any of examples 22-30, wherein the determining match costs $C_{East}(P,d)$ comprises determining match costs $C_{East}(P,d)$ for a pixel at all considered disparities in one pixel-clock lime.

Example 32 may include the subject matter of any of examples 22-31, wherein determining one or more additional match costs comprises determining each of the one or more additional match costs for a pixel at all considered disparities in one pixel clock time.

Example 33 may include at least one machine readable medium comprising a plurality of instructions that in response to being executed on a computing device, cause the computing device to carry out a method according to any one of examples 22-32.

Example 34 may include a computer system to perform the method of any one of examples 22-32.

Example 35 may include an apparatus configured to perform the method of any one of examples 22-32.

Example 36 may include a machine to perform the method of any one of examples 22-32. Example 37 may include an apparatus comprising means for performing the method of any one of examples 22-32.

Examples 38 may include a computing device comprising a chipset according to any one of examples 22-32 and memory to process images.

Example 39 may include a system for use in image processing, comprising an image processor comprising a first logic unit configured to, for each pixel P between a pair of stereo images input for processing, and for each considered disparity, determine a match cost for each of a set of given orientations of pixel processing, where the set of given orientations includes an east orientation and one or more other orientations, where the match cost for a given orientation incorporates data associated with a pixel located at that orientation from a perspective of pixel P, and where subsequent match cost determinations are based on previously stored match cost determinations; a second logic unit configured to determine an overall match cost for each pixel P at each considered disparity based on a sum of determined match costs for all of the orientations for each pixel and disparity pair; and a third logic unit configured to determine a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images. The system also may include a memory in communication with the image processor that is used to store necessary data in the determination of the match costs and resulting disparities.

Example 40 may include the subject matter of example 39, wherein the determining of the match cost by the first logic unit comprises determining a basic match cost $C(P,d)$ at each pixel P; determining a match cost $C_{West}(P,d)$ for each pixel P based on corresponding determined basic match costs $C(P,d)$, wherein match cost $C_{West}(P,d)$ incorporates data associated with a.

pixel located to the west of pixel P, and determining a match cost $C_{East}(P,d)$ for each pixel P based on corresponding determined basic match costs $C(P,d)$, wherein match cost $C_{East}(P,d)$ incorporates data associated with a pixel located to the east of pixel P, wherein prior to starting the determination of match costs $C_{East}(P,d)$, the determined basic match costs $C(P,d)$ and match costs $C_{West}(P,d)$ at each disparity for a scanline row of pixels are stored such that basic match costs $C(P,d)$ and match costs $C_{West}(P,d)$ are made available as necessary to determine $C_{East}(P,d)$ in right to left order.

Example 41 may include the subject matter of example 40, wherein the determined basic match costs $C(P,d)$ and match costs $C_{West}(P,d)$ are stored from left-to-right and right-to-left for alternate scanline rows with reference to pixel locations of the input images such that the same storage can be used for both the row in which $C(P,d)$ and $C_{West}(P,d)$ is computed and for the row in which $C_{East}(P,d)$ is computed.

Example 42 may include the subject matter of any of examples 39-41, wherein a minimum storage capacity in the memory for determining match costs is proportional to a value representing the number of pixels of a single scanline of pixels of the input images multiplied by a value representing the number of considered disparities.

Example 43 may include the subject matter of any of examples 39-42, wherein a latency associated with the determination of the match costs and resulting disparities is proportional to an amount of time it takes to read in a single scanline of image data of the input images.

Example 44 may include a computer program product for image processing, including at least one non-transitory computer readable medium having computer program logic stored therein, the computer program logic including logic to cause a processor to, for each pixel P between a pair of stereo images input for processing, and for each considered disparity, determine a match cost for each of a set of given orientations of pixel processing, where the set of given orientations includes an east orientation and one or more other orientations, where the match cost for a given orientation incorporates data associated with a pixel located at that orientation from a perspective of pixel P, and where subsequent match cost determinations are based on previously stored match cost determinations; logic to cause the processor to determine an overall match cost for each pixel P at each considered disparity based on a sum of determined match costs for all of the orientations for each pixel and disparity pair; and logic to cause the processor to determine a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images.

Example 45 may include the subject matter of example 44, wherein the logic to cause the processor to determine the match cost includes logic to cause the processor to determine a basic match cost C(P,d) at each pixel P; determine a match cost $C_{West}(P,d)$ for each pixel P based on corresponding determined basic match costs C(P,d), wherein match cost $C_{West}(P,d)$ incorporates data associated with a pixel located to the west of pixel P, and determine a match cost $C_{East}(P,d)$ for each pixel P based on corresponding determined basic match costs C(P,d), wherein match cost $C_{East}(P,d)$ incorporates data associated with a pixel located to the east of pixel P, wherein prior to starting the determination of match costs $C_{East}(P,d)$, the determined basic match costs C(P,d) and match costs $C_{West}(P,d)$ at each disparity for a scanline row of pixels are stored such that basic match costs C(P,d) and match costs $C_{West}(P,d)$ are made available as necessary to determine $C_{East}(P,d)$ in right to left order.

Example 46 may include the subject matter of any of examples 45, wherein the computer program logic further comprises logic to cause the processor to store the determined basic match costs C(P,d) and match costs $C_{West}(P,d)$ from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

Example 47 may include the subject matter of any of examples 44-46, wherein a minimum storage capacity for the determination of match costs is proportional to a value representing the number of pixels of a single scanline of pixels of the input images multiplied by a value representing the number of considered disparities.

Example 48 may include the subject matter of any of examples 44-47, wherein a latency associated with the determination of the match costs and resulting disparities is proportional to an amount of time it takes to read in a single scanline of image data of the input images.

Example 49 may include means for, for each pixel P between a pair of stereo images input for processing, and for each considered disparity, determining a match cost for each of a set of given orientations of pixel processing, where the set of given orientations includes an east orientation and one or more other orientations, where the match cost for a given orientation incorporates data associated with a pixel located at that orientation from a perspective of pixel P, and where subsequent match cost determinations are based on previously stored match cost determinations; means for determining an overall match cost for each pixel P at each considered disparity based on a sum of determined match costs for all of the orientations for each pixel and disparity pair; and means for determining a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images.

Example 50 may include the subject matter of example 49, wherein the means for determining the match cost comprises means for determining a basic match cost C(P,d) at each pixel P; means for determining a match cost $C_{West}(P,d)$ for each pixel P based on corresponding determined basic match costs C(P,d), wherein match cost $C_{West}(P,d)$ incorporates data associated with a pixel located to the west of pixel P, and means for determining a match cost $C_{East}(P,d)$ for each pixel P based on corresponding determined basic match costs C(P,d), wherein match cost $C_{East}(P,d)$ incorporates data associated with a pixel located to the east of pixel P, wherein prior to starting the determination of match costs $C_{East}(P,d)$, the determined basic match costs C(P,d) and match costs $C_{West}(P,d)$ at each disparity for a scanline row of pixels are stored such that basic match costs C(P,d) and match costs $C_{West}(P,d)$ are made available as necessary to determine $C_{East}(P,d)$ in right to left order.

Example 51 may include the subject matter of example 50, wherein the determined basic match costs C(P,d) and match costs $C_{West}(P,d)$ are stored from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

In example 52, the subject matter of any of examples 49-51 may optionally include means for storing necessary data in the determination of the match costs, wherein a minimum storage capacity for the determination of match costs is proportional to a value representing the number of pixels of a single scanline of pixels of the input images multiplied by a value representing the number of considered disparities.

Example 53 may include the subject matter of any of examples 49-52, wherein a latency associated with the determination of the match costs and resulting disparities is proportional to an amount of time it takes to read in a single scanline of image data of the input images.

Example 54 may include a method of image processing, comprising, for each pixel P between a pair of stereo images input for processing, and for each considered disparity, determining, by a computing device, a match cost for each of a set of given orientations of pixel processing, where the set of given orientations includes an east orientation and one or More other orientations, where the match cost for a given orientation incorporates data associated with a pixel located at that orientation from a perspective of pixel P, and where subsequent match cost determinations are based on previously stored match cost determinations; determining, by the computing device, an overall match cost for each pixel P at each considered disparity based on a sum of determined match costs for all of the orientations for each pixel and disparity pair; and determining, by the computing device, a resulting disparity for each pixel P based on a minimum of the determined overall match costs, wherein a subset of the determined resulting disparities becomes available prior to completion of the input images being read in, and wherein the resulting disparities for all pixels of the stereo images are determined in a single pass through the input images.

Example 55 may include the subject natter of example 54, wherein the determining the match cost comprises determining a basic match cost C(P,d) at each pixel P; determining a match cost $C_{West}(P,d)$ for each pixel P based on corresponding determined basic match costs C(P,d), wherein match cost $C_{West}(P,d)$ incorporates data associated with a pixel located to the west of pixel P, and determining a match cost $C_{East}(P,d)$ for each pixel P based on corresponding determined basic match costs C(P,d), wherein match cost $C_{East}(P,d)$ incorporates data associated with a pixel located to the east of pixel P; and storing, prior to starting the determination of match costs $C_{East}(P,d)$, the determined basic match costs C(P,d) and match costs $C_{West}(P,d)$ at each disparity for a scanline row of pixels such that basic match costs C(P,d) and match costs $C_{West}(P,d)$ are made available as necessary to determine $C_{East}(P,d)$ in right to left order.

Example 56 may include the subject matter of example 55, wherein the storing comprises storing the determined basic match costs C(P,d) and match costs $C_{West}(P,d)$ from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

Example 57 may include the subject matter of example 55, wherein the determining the basic match cost C(P,d) comprises determining the basic match cost C(P,d) such that basic match costs C(P,d) for a pixel at each disparity are determined simultaneously.

Example 58 may include the subject matter of example 55, wherein the determination of match costs $C_{West}(P,d)$ for a pixel at all considered disparities occurs in one pixel-clock time.

Example 59 may include the subject matter of example 55, wherein the determination of match costs $C_{East}(P,d)$ for a pixel at all considered disparities occurs in one pixel-clock time.

Example 60 may include the subject matter of any of examples 54-59 wherein a minimum storage capacity for the determination of match costs is proportional to a value representing the number of pixels of a single scanline of pixels of the input images multiplied by a value representing the number of considered disparities.

Example 61 may include the subject matter of any of examples 54-60, wherein a latency associated with the determination of the match costs and resulting disparities is proportional to an amount of time it takes to read in a single scanline of image data of the input images. Example 62 may include the subject matter of any of examples 54, 60, and 61, wherein the set of given orientations further includes one or more of a west orientation, a north orientation, a northwest orientation, and a northeast orientation.

Example 63 may include the subject matter of any of examples 54 and 60-62, wherein the set of given orientations further includes one or more alternative orientations, wherein the one or more alternative orientations include orientations other than east, west, north, northwest, northeast, and anywhere south of pixel P.

Example 64 may include the subject matter of any of examples 54-63, wherein the determining the match costs for each orientation is based on the equation:

$$C_o(P,d)=C(P,d)+\min[C_o(P_o,d), C_o(P_o,d-1)+k1, C_o(P_o,d+1)+k1, \min/x\, C_o(P_o,x)+k2]-\min/y\, C_o(P_o,y)$$

where
$C_o$ represents the match cost at an orientation o of the set of orientations,
C represents a basic match cost,
$P_o$ represents a pixel in orientation o from pixel P,
d represents the considered disparity,
k1 and k2 represent defined penalty costs; and
x and y each represent a range of the considered disparities.

Example 65 may include at least one machine readable medium comprising a plurality of instructions that in response to being executed on a computing device, cause the computing device to carry out a method according to any one of examples 54-64.

Example 66 may include a computer system to perfbrin the method of any one of examples 54-64.

Example 67 may include an apparatus configured to perform the method of any one of examples 54-64.

Example 68 may include a machine to perform the method of any one of examples 54-64.

Example 69 may include an apparatus comprising means for performing the method of any one of examples 54-64.

Example 70 may include a computing device comprising a chipset according to any one of examples 54-64 and memory to process images.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may he made therein without departing from the scope of the methods and systems disclosed herein. Thus, the breadth and scope of the claims should not be limited by any of the exemplary embodiments disclosed herein.

As may be used in this application and in the claims, a list of items joined by the term "one or more of" can mean any combination of the listed terms. For example, the phrases "one or more of A, B or C" can mean A; B; C, A and B; A and C; B and C; or A, B and C.

What is claimed is:
1. A system for use in image processing, comprising:
an image processor comprising:
a basic match cost logic unit configured to determine, for a given set of disparities d, a basic match cost C(P,d) at each pixel P between a pair of stereo images input for processing;
an east orientation cost logic unit configured to determine a match cost $C_{East}(P,d)$ for each pixel P based on corresponding determined basic match costs C(P,d), wherein match cost $C_{East}(P,d)$ incorporates data associated with a pixel located to the east of pixel P;
one or more additional orientation cost logic units configured to determine one or more additional match costs for each pixel P, the one or more additional match costs incorporating data associated with pixels at one or more other directional orientations from a perspective of pixel P; and
a disparity logic unit configured to:
determine an overall match cost for each pixel P at each of disparities d based on a sum of the determined match costs for all considered orientations for each pixel and disparity pair; and
determine a resulting disparity for each pixel P based on a minimum of the determined overall match costs,
wherein a subset of the determined resulting disparities becomes available prior to completion of the input images being read in, and wherein the resulting disparities for all pixels of the stereo images are determined in a single pass through the input images; and a memory, in communication with the image processor, that is used to store necessary data in the determination of the match costs and resulting disparities.

2. The system of claim 1,
wherein the one or more additional orientation cost logic units include a west orientation cost logic unit configured to determine a match cost $C_{West}(P,d)$ for each pixel P based on corresponding determined basic match costs C(P,d), wherein match cost $C_{West}(P,d)$ incorporates data associated with a pixel located to the west of pixel P; and
wherein, prior to starting the determination of match costs $C_{East}(P,d)$, the determined basic match costs C(P,d) and match costs $C_{West}(P,d)$ at each disparity for a scanline row of pixels are stored such that basic match costs C(P,d) and match costs $C_{West}(P,d)$ are made available as necessary to determine $C_{East}(P,d)$ in right to left order.

3. The system of claim 2, wherein the determined basic match costs C(P,d) and match costs $C_{West}(P,d)$ are stored from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

4. The system of claim 1, wherein a minimum storage capacity of the memory for the determination of match costs is proportional to a value representing the number of pixels of a single scanline of pixels of the input images multiplied by a value representing the number of considered disparities.

5. The system of claim 1, wherein a latency associated with the determination of the match costs and resulting disparities is proportional to an amount of time it takes to read in a single scanline of image data of the input images.

6. A computer program product for image processing, including at least one non-transitory computer readable medium having computer program logic stored therein, the computer program logic including:
logic to cause a processor to determine, for a given set of disparities d, a basic match cost C(P,d) at each pixel P between a pair of stereo images input for processing;
logic to cause the processor to determine a match cost $C_{East}(P,d)$ for each pixel P based on corresponding determined basic match costs C(P,d), wherein match cost $C_{East}(P,d)$ incorporates data associated with a pixel located to the east of pixel P;
logic to cause the processor to determine one or more additional match costs for each pixel P, the one or more additional match costs incorporating data associated with pixels at one or more other directional orientations from a perspective of pixel P;
logic to cause the processor to determine an overall match cost for each pixel P at each of disparities d based on a sum of the determined match costs for all considered orientations for each pixel and disparity pair; and
logic to cause the processor to determine a resulting disparity for each pixel P based on a minimum of the determined overall match costs,
wherein a subset of the determined resulting disparities becomes available prior to completion of the input images being read in, and wherein the resulting disparities for all pixels of the stereo images are determined in a single pass through the input images.

7. The computer program product of claim 6,
wherein the logic to cause the processor to determine one or more additional match costs comprises logic to cause the processor to determine a match cost $C_{West}(P,d)$ for each pixel P based on corresponding determined basic match costs C(P,d), wherein match cost $C_{West}(P,d)$ incorporates data associated with a pixel located to the west of pixel P, and
wherein the computer program logic further comprises logic to cause the processor to store, prior to starting the determination of match costs $C_{East}(P,d)$, the determined basic match costs C(P,d) and match costs $C_{West}(P,d)$ at each disparity for a scanline row of pixels such that basic match costs C(P,d) and match costs $C_{West}(P,d)$ are made available as necessary to determine $C_{East}(P,d)$ in right to left order.

8. The computer program product of claim 7, wherein the computer program logic further comprises logic to cause the processor to store the determined basic match costs C(P,d) and match costs $C_{West}(P,d)$ from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

9. The computer program product of claim 6, wherein a minimum storage capacity for the determination of match costs is proportional to a value representing the number of pixels of a single scanline of pixels of the input images multiplied by a value representing the number of considered disparities.

10. The computer program product of claim 6, wherein a latency associated with the determination of the match costs and resulting disparities is proportional to an amount of time it takes to read in a single scanline of image data of the input images.

11. An apparatus for image processing, comprising:
means for determining, for a given set of disparities d, a basic match cost C(P,d) at each pixel P between a pair of stereo images input for processing;
means for determining a match cost $C_{East}(P,d)$ for each pixel P based on corresponding determined basic match costs C(P,d), wherein match cost $C_{East}(P,d)$ incorporates data associated with a pixel located to the east of pixel P;
means for determining one or more additional match costs for each pixel P, the one or more additional match costs incorporating data associated with pixels at one or more other directional orientations from a perspective of pixel P;
means for determining an overall match cost for each pixel P at each of disparities d based on a sum of the determined match costs for all considered orientations for each pixel and disparity pair; and
means for determining a resulting disparity for each pixel P based on a minimum of the determined overall match costs,
wherein a subset of the determined resulting disparities becomes available prior to completion of the input images being read in, and wherein the resulting disparities for all pixels of the stereo images are determined in a single pass through the input images.

12. The apparatus of claim 11, wherein the means for determining one or more additional match costs includes means for determining a match cost $C_{West}(P,d)$ for each pixel P based on corresponding determined basic match costs C(P,d), wherein match cost $C_{West}(P,d)$ incorporates data associated with a pixel located to the west of pixel P, and wherein the apparatus further comprises:
means for storing, prior to starting the determination of match costs $C_{East}(P,d)$, the determined basic match costs C(P,d) and match costs $C_{West}(P,d)$ at each disparity for a scanline row of pixels such that basic match costs C(P,d)

and match costs $C_{West}(P,d)$ are made available as necessary to determine $C_{East}(P,d)$ in right to left order.

13. The apparatus of claim 12, wherein the determined basic match costs C(P,d) and match costs $C_{West}(P,d)$ are stored from left-to-right and right-to-left for alternate scanline rows with reference to pixel locations of the input images such that the same storage can be used for both the row in which C(P,d) and $C_{West}(P,d)$ are computed and for the row in which $C_{East}(P,d)$ is computed.

14. The apparatus of claim 11, further comprising:
means for storing necessary data in the determination of the match costs,
wherein a minimum storage capacity for the determination of match costs is proportional to a value representing the number of pixels of a single scanline of pixels of the input images multiplied by a value representing the number of considered disparities.

15. The apparatus of claim 11, wherein a latency associated with the determination of the match costs and resulting disparities is proportional to an amount of time it takes to read in a single scanline of image data of the input images.

16. A method of image processing, comprising:
determining, by a computing device, for a given set of disparities d, a basic match cost C(P,d) at each pixel P between a pair of stereo images input for processing;
determining, by the computing device, a match cost $C_{East}(P,d)$ for each pixel P based on corresponding determined basic match costs C(P,d), wherein match cost $C_{East}(P,d)$ incorporates data associated with a pixel located to the east of pixel P;
determining, by the computing device, one or more additional match costs for each pixel P, the one or more additional match costs incorporating data associated with pixels at one or more other directional orientations from a perspective of pixel P;
determining, by the computing device, an overall match cost for each pixel P at each of disparities d based on a sum of the determined match costs for all considered orientations for each pixel and disparity pair; and
determining, by the computing device, a resulting disparity for each pixel P based on a minimum of the determined overall match costs,
wherein a subset of the determined resulting disparities becomes available prior to completion of the input images being read in, and wherein the resulting disparities for all pixels of the stereo images are determined in a single pass through the input images.

17. The method of claim 16, wherein determining one or more additional match costs includes determining a match cost $C_{West}(P,d)$ for each pixel P based on corresponding determined basic match costs C(P,d), wherein match cost $C_{West}(P,d)$ incorporates data associated with a pixel located to the west of pixel P, and wherein the method further comprises:
prior to starting the determination of match costs $C_{East}(P,d)$, storing determined basic match costs C(P,d) and match costs $C_{West}(P,d)$ at each disparity for a scanline row of pixels such that basic match costs C(P,d) and match costs $C_{West}(P,d)$ are made available as necessary to determine $C_{East}(P,d)$ in right to left order.

18. The method of claim 17, wherein the determined basic match costs C(P,d) and match costs $C_{West}(P,d)$ are stored from left-to-right and right-to-left for alternate scanline rows with reference to pixel locations of the input images such that the same storage can be used for both the row in which C(P,d) and $C_{West}(P,d)$ is computed and for the row in which $C_{East}(P,d)$ is computed.

19. The method of claim 16, wherein a minimum storage capacity for the determination of match costs is proportional to a value representing the number of pixels of a single scanline of pixels of the input images multiplied by a value representing the number of considered disparities.

20. The method of claim 16, wherein a latency associated with the determination of the match costs and resulting disparities is proportional to an amount of time it takes to read in a single scanline of image data of the input images.

21. The method of claim 16, wherein determining one or more additional match costs includes determining one or more of:
determining a match cost $C_{West}(P,d)$ for each pixel P based on corresponding determined basic match costs C(P,d), wherein match cost $C_{West}(P,d)$ incorporates data associated with a pixel located to the west of pixel P; and
determining one or more northern-orientated match costs for each pixel P based on corresponding determined basic match costs C(P,d), wherein the one or more northern-orientated match costs include one or more of $C_{North}(P,d)$ that incorporates data associated with a pixel located to the north of pixel P, $C_{Northwest}(P,d)$ that incorporates data associated with a pixel located to the northwest of pixel P, and $C_{Northeast}(P,d)$ that incorporates data associated with a pixel located to the northeast of pixel P.

22. The method of claim 16, wherein determining one or more additional match costs includes determining one or more alternative-orientated match costs for each pixel P based on corresponding determined basic match costs C(P,d), wherein the alternative-orientated match costs incorporate data associated with pixels other than pixels located east, west, north, northwest, northeast, and anywhere south of pixel P.

23. The method of claim 16, wherein the determining of match costs for each orientation are based on the equation:

$$C_o(P,d) = C(P,d) + \min[C_o(P_o,d), C_o(P_o,d-1)+k1, C_o(P_o,d+1)+k1, \min/x\, C_o(P_o,x)+k2] - \min/y\, C_o(P_o,y)$$

where
$C_o$ represents the match cost at an orientation o,
C represents a basic match cost,
$P_o$ represents a pixel in orientation o from pixel P,
d represents the considered disparity,
k1 and k2 represent defined penalty costs; and
x and y each represent a range of considered disparities.

24. The method of claim 16, wherein the determining basic match costs C(P,d) comprises determining basic match costs C(P,d) for a pixel at each disparity simultaneously.

25. The method of claim 16, wherein the determining match costs $C_{East}(P,d)$ comprises determining match costs $C_{East}(P,d)$ for a pixel at all considered disparities in one pixel-clock time.

* * * * *